United States Patent
Mackouse

(10) Patent No.: US 10,055,945 B2
(45) Date of Patent: Aug. 21, 2018

(54) CUSTOMER CONTROLLED ACCOUNT, SYSTEM, AND PROCESS

(75) Inventor: Jack Mackouse, Walnut Creek, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 176 days.

(21) Appl. No.: 13/277,514

(22) Filed: Oct. 20, 2011

(65) Prior Publication Data

US 2012/0109822 A1    May 3, 2012

Related U.S. Application Data

(62) Division of application No. 11/879,048, filed on Jul. 12, 2007, now Pat. No. 8,069,084.

(Continued)

(51) Int. Cl.
    *G06Q 20/00*    (2012.01)
    *G06Q 40/00*    (2012.01)
    (Continued)

(52) U.S. Cl.
    CPC ............ *G07F 19/00* (2013.01); *G06Q 20/10* (2013.01); *G06Q 20/105* (2013.01);
    (Continued)

(58) Field of Classification Search
    None
    See application file for complete search history.

(56) References Cited

U.S. PATENT DOCUMENTS 6,175,922 B1   1/2001  Wang
6,363,488 B1   3/2002  Ginter et al.

(Continued)

FOREIGN PATENT DOCUMENTS

EP   1 029 311   8/2000
EP   1 115 095   7/2001

(Continued)

OTHER PUBLICATIONS

Barlow, T. et al; Trust Negotiation in Electronic Markets; Proceedings of the Eighth Research Symposium on Emerging Electronic Markets (RSEEM 01); Maastricht, The Netherlands, Sep. 16-18, 2001; http://www¬--i5.informatik.rwth-aachen.de/conf/rseem 2001/.

(Continued)

*Primary Examiner* — Ariel J Yu
(74) *Attorney, Agent, or Firm* — Foley & Lardner LLP

(57) ABSTRACT

Access devices like credit cards and/or check cards have enhanced security features that allow a customer to control circumstances under which their account is accessed. Fraudsters may try to access the account without the knowledge of the consumer set controls, the system takes remedial action with reduced instances of false positives. An account is established for an account holder through a central entity, e.g. an issuer. At least one user is associated with the access device that is established for one or more transactions. Use of the access devices is defined by a set of rules defined by the central entity and are controllable by the customer, including comprising any of the account holder and the user of the account. The customer inputs, controls, and/or updates parameters associated with the customer-controllable rules. Subsequent authorization of the access devices is controlled based on the customer input and other controls.

19 Claims, 13 Drawing Sheets

Related U.S. Application Data

(60) Provisional application No. 60/807,424, filed on Jul. 14, 2006.

(51) Int. Cl.

| | | |
|---|---|---|
| *G07F 19/00* | (2006.01) | |
| *G06Q 20/10* | (2012.01) | |
| *G06Q 20/20* | (2012.01) | |
| *G06Q 20/24* | (2012.01) | |
| *G06Q 20/40* | (2012.01) | |
| *G06Q 30/06* | (2012.01) | |

(52) U.S. Cl.
CPC .......... *G06Q 20/204* (2013.01); *G06Q 20/24* (2013.01); *G06Q 20/40* (2013.01); *G06Q 30/0601* (2013.01); *G06Q 30/0621* (2013.01)

(56) References Cited

U.S. PATENT DOCUMENTS

| | | | |
|---|---|---|---|
| 6,438,594 B1 | 8/2002 | Bowman-Amuah | |
| 6,601,192 B1 | 7/2003 | Bowman-Amuah | |
| 6,607,136 B1 | 8/2003 | Atsmon et al. | |
| 6,629,081 B1 | 9/2003 | Cornelius et al. | |
| 6,636,242 B2 | 10/2003 | Bowman-Amuah | |
| 6,636,833 B1 | 10/2003 | Flitcroft et al. | |
| 7,043,230 B1 | 5/2006 | Geddes et al. | |
| 7,413,112 B2 | 8/2008 | Nelson | |
| 7,716,097 B2* | 5/2010 | Tyson-Quah | 705/35 |
| 8,538,863 B1* | 9/2013 | Saunders | 705/38 |
| 2001/0032192 A1 | 10/2001 | Putta et al. | |
| 2001/0051920 A1 | 12/2001 | Joao et al. | |
| 2002/0091635 A1 | 7/2002 | Dilip et al. | |
| 2002/0095386 A1 | 7/2002 | Maritzen et al. | |
| 2002/0152160 A1 | 10/2002 | Allen-Rouman et al. | |
| 2003/0028481 A1 | 2/2003 | Flitcroft et al. | |
| 2003/0093367 A1 | 5/2003 | Allen-Rouman et al. | |
| 2003/0208439 A1* | 11/2003 | Rast | 705/38 |
| 2003/0212904 A1 | 11/2003 | Randle et al. | |
| 2004/0059686 A1 | 3/2004 | Levesque | |
| 2004/0097217 A1 | 5/2004 | McClain | |
| 2004/0185830 A1 | 9/2004 | Joao et al. | |
| 2004/0188519 A1 | 9/2004 | Cassone | |
| 2005/0015329 A1* | 1/2005 | Tyson-Quah | G06Q 20/10 705/38 |
| 2005/0038715 A1 | 2/2005 | Sines et al. | |
| 2005/0131826 A1 | 6/2005 | Cook | |
| 2005/0182724 A1 | 8/2005 | Willard | |
| 2005/0205662 A1* | 9/2005 | Nelson | G06Q 20/12 235/380 |
| 2005/0273431 A1* | 12/2005 | Abel | G06Q 20/02 705/42 |
| 2006/0036553 A1* | 2/2006 | Gupta et al. | 705/52 |

FOREIGN PATENT DOCUMENTS

| | | |
|---|---|---|
| EP | 1 153 375 | 11/2001 |
| EP | 1 265 200 | 12/2002 |
| EP | 1 515 216 | 3/2005 |
| EP | 1 555 591 | 7/2005 |
| EP | 1 621 960 | 2/2006 |
| WO | WO-00/16252 | 3/2000 |
| WO | WO-00/49586 | 8/2000 |
| WO | WO-00/73958 | 12/2000 |
| WO | WO-01/23989 | 4/2001 |
| WO | WO-01/42965 | 6/2001 |
| WO | WO-02/41236 | 5/2002 |
| WO | WO-03/003704 | 1/2003 |
| WO | WO-03/040869 | 5/2003 |
| WO | WO-03/096252 | 11/2003 |
| WO | WO-2004/017170 | 2/2004 |
| WO | WO-2004/038528 | 5/2004 |
| WO | WO-2005/015485 | 2/2005 |
| WO | WO-2006/004794 | 1/2006 |

OTHER PUBLICATIONS

Brennan, D.; In the Eye of the Cardholder; Banker, 151, 900, 82; Feb. 2001; Copyright 2001 Financial Times Information Ltd.
Consumer Card Services: Credit Card Authorization Services; http://www.eds.com/services/consumercard/; © 2006 Electronic Data Systems Corporation.
Gifford, D.K. et al.; Payment Switches for Open Networks; Proceedings of the First USENIX Workshop on Electronic Commerce; New York, NY; Jul. 1995.
Gillett, M.T. et al; Developments in Cyberbanking; Business Lawyer v59n3 pp. 1335-1345; May 2004.
Husemann, D.; The Smart Card: Don't Leave Home Without It; IEEE Concurrency vol. 7, No. 2 p. 24-7; IEEE; Apr.-Jun. 1999; USA.
Kay, W.; Banks Eye One-Page Web Wonder; The American System of Profiling All Your Accounts on One Web Page Is Beginning to Gain Acceptance, Says William Kay. But the Big Problem Centres on the Dangers of Fraud; Nov. 2, 2002; Copyright 2002 Independent Newspapers (UK) Limited Source: Financial Times Information Limited—Europe Intelligence Wire.
Lepofsky, R.; Preventing Identity Theft; Risk Management vol. 51, No. 10 p. 34-40; Risk Manag. Soc; Oct. 2004; USA.
Marlin, S.; Wells Fargo Makes Good on eBay [Online Retail Payments]; Information WEEK No. 992 p. 67; CMP Media Inc; Jun. 7, 2004; USA.
Notice of Allowance on U.S. Appl. No. 11/879,048, dated Jul. 21, 2011, 5 pages.
Office Action on U.S. Appl. No. 11/879,048, dated Feb. 3, 2011, 8 pages.
Puente, F. et al.; Improving Online Banking Security With Hardware Devices; Proceedings of the IEEE 39th International Carnahan Conference on Security Technology (IEEE Cat. No. 05CH37697) p. 174-7; IEEE, Piscataway, NJ, USA; 2005.
Shogase, H.; A Very Intelligent Credit Card Is a True and Private Pocket Bank; Elettrotecnica vol. 76, No. 3 p. 225-30; Mar. 1989; Italy.
Smith, A.; Collaboration in Combating Online Fraud; Banking Technology p. XVI-I; IBC Business Publishing; Apr. 2005; UK.
VASCO Launches Digipass Host Authentication to Tackle Rapidly Growing Phishing Problem; PR Newswire, p NA; Aug. 17, 2004.

* cited by examiner

CUSTOMER CONTROLLED ACCOUNT, SYSTEM, AND PROCESS

CROSS REFERENCE TO RELATED APPLICATIONS

This Application claims priority from and is a divisional application of co-pending U.S. patent application Ser. No. 11/879,048, entitled Customer Controlled Account, System, and Process, filed Jul. 12, 2007 which claimed priority to U.S. Provisional Application No. 60/807,424, entitled Customer Controlled Account, filed Jul. 14, 2006, each of which are incorporated herein in their entirety by this reference thereto.

FIELD OF THE INVENTION

The invention relates to the field of credit card and check card systems between devices operating across a network. More particularly, the invention relates to controllable security structures and processes for credit card accounts and check card accounts operating across a network.

BACKGROUND OF THE INVENTION

Financial institutions and/or other organizations typically issue consumers or businesses with access "devices", such as credit cards or debit cards. Authorized users of such access devices can then make purchases and/or obtain financial instruments, e.g. such as at a point of sale, through an ATM, through an internet site, or at another remote location In an attempt to control misuse, issuers of access devices and related institutions have created numerous processes, materials and techniques to reduce the risks referenced. Such efforts include consumer education and sophisticated authorization systems.

Authorization systems involve the combined efforts of various organizations in the value chain, such as merchants or entities that accept the device or access methods, issuers who provide accounts and access devices or access methods to consumers and business users, and associations such as MASTERCARD®, AMERICAN EXPRESS®, VISA® and DISCOVER®, that provide rules and guidelines for managing the card payment environment.

In a typical example, a user applies for and is issued a credit or check card, wherein a credit card accesses a line of credit, while a check card accesses the consumer's available funds. To use the device, the user presents the device and/or account access information (account number, CVV number, verification information, etc.) to a merchant to purchase goods, services or funds, such as through a physical, i.e. brick and mortar, store, via telephone, or through an Internet site.

Before providing the goods, services or funds, the merchant first authorizes the transaction either through a terminal or other means. In the authorization process, the merchant must follow certain guidelines including providing information from the presenter of the device. If the authorization is approved, the merchant provides the goods, services or funds.

If at a later time it is determined that the receiver of the goods, services or funds was a "fraudster", the system has been defrauded with various negative consequences such as: the access device can be shut down, the consumer may be materially inconvenienced and/or suffer financial loss, the provider of the device or the merchant suffer financial loss, and/or confidence in the payments system is negatively impacted.

Some financial companies have started barring all credit and/or debit transactions originating from nations that exhibit high levels of fraud. For example, as reported in "Blocking Entire Nations to Curtail Card Fraud", by David Breitkopf, American Banker, Jan. 30, 2006, "One of the more extreme examples: First Bank and Trust Co. of Abingdon, Va., which issues Visa debit cards, does not accept transactions originating anywhere outside the United States unless a customer asks for permission to use their cards abroad."

Almost all, if not all issuers of these devices set parameters that will result in a declined authorization under certain circumstances, such as but not limited to a number of transactions that exceeds some threshold, or a pattern of transactions that results in a score below a threshold. A key problem is that this approach leads to "false positives", in that transactions that should or could have been approved are declined, and sometimes approves transactions that turn out to be fraudulent. A transaction that exceeds a credit line is typically treated as a factual factor, which results in either a yes or no decision, but does not lead to a false positive.

Current systems do include a variety of customer control features such as:
 being required to contact the device issuer to activate their account or access device;
 being required to use a PIN or personal identification number in some cases; and/or
 as noted above, in some cases being required to call and request to turn access on, such as if the user plans to use the card internationally.

It would be advantageous to provide a system, structure and method such that access devices and their use may provide increased security, for users and for financial institutions, as compared to security infrastructures that are currently available. The development of an enhanced customer account system and associated method would constitute a major technological advance.

As well, it would be advantageous to provide a system, structure and method wherein an account holder may be further involved with defining where and how their credit cards and/or debit cards are used. The development of such a transaction system would constitute a further major technological advance.

In addition, it would be advantageous to provide a system, structure and method wherein an account holder and other appropriate parties within the network who have a need to know may be notified if and when there is an attempt to access the account holder's credit card and/or debit card account in a manner that is counter to parameters for account access that have been set by the account holder. This would allow the account holders and/or other appropriate parties to take preemptive action to thwart the intentions of fraudsters, not only for the account holder in which fraudulent access has been attempted, but also potentially for others based upon gained information. The development of such a transaction system and process would constitute an additional technological advance.

SUMMARY OF THE INVENTION

Enhanced access devices, such as credit cards and/or check cards, are issued with enhanced security features and processes that allow customer control of the circumstances under which their account can be accessed. If a fraudster tries to access the account without knowledge of the customer set controls, the system can take remedial action. In an exemplary process, an account is established for an account holder or holders, such as through a computer associated with a central entity, e.g. an issuer. At least one access device associated with the account is established, wherein at least one user is associated with at least one of the access devices for one or more transactions. Use of the established access devices is defined by at least one rule defined by the central entity and at least one rule that is controllable by at least a customer of the account, the customer typically comprising any account holder or person that is deemed to be accountable or liable for the actions of account holders or other account users authorized by the account holder to access the account. The customer can then input, such as by any of selection, identification, and entry, at least one parameter associated with the customer-controllable rules. Subsequent authorization of at least one of the established access devices is then controlled based on the customer input and other controls.

DETAILED DESCRIPTION OF PREFERRED EMBODIMENTS

Figure 1:
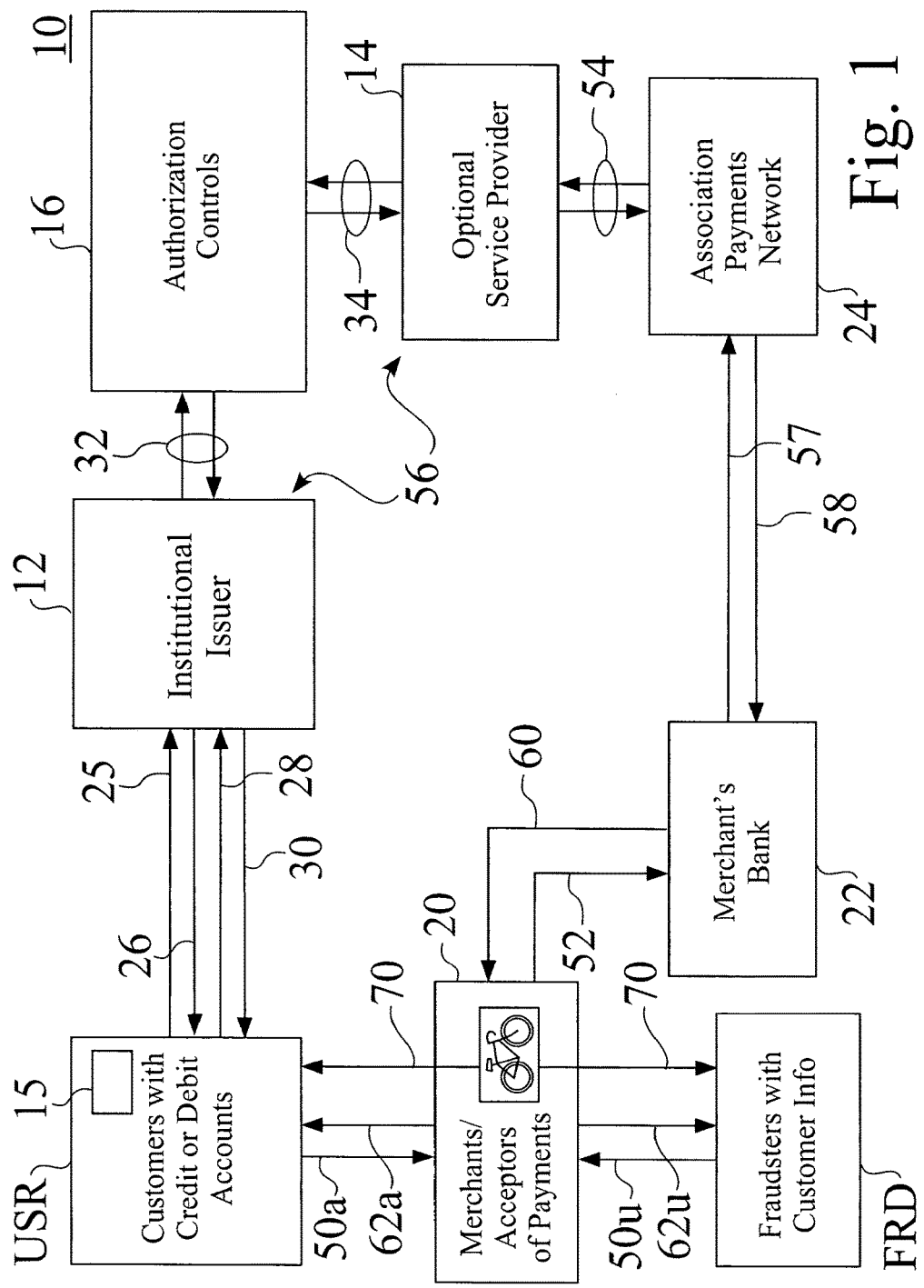
FIG. 1 is a schematic view of typical payment system, wherein fraudulent access is allowed within a payment structure having a centralized rule structure.

FIG. 1 is a schematic view of typical payment system 10, wherein fraudulent access is allowed within a payment structure having a centralized rule structure.

In an attempt to control misuse, issuers 12, e.g. Wells Fargo Bank, of access devices 15 and related institutions, e.g. service providers 14, provide numerous processes, materials and techniques to reduce risks associated with identity theft and fraudulent use of access devices. Such efforts include consumer education and sophisticated authorization systems.

Authorization systems involve the combined efforts of various organizations in the value chain, such as merchants or entities 10 that accept the device or access methods 15, issuers who provide accounts and access devices or access methods to consumers and business users, and associations such as MASTERCARD®, AMERICAN EXPRESS®, VISA® and DISCOVER®, that provide rules and guidelines for managing the card payment environment 10.

As seen in FIG. 1, a user USR receives 26 an access device 15, e.g. a credit card or debit card 15, such as by requesting 25 or otherwise applying for the access device 15 though a an institutional issuer 12, e.g. a financial institution (FI)12. The receipt of the access device 15 is typically confirmed 28 by the user to the institutional issuer 12, at which time the access device is activated.

Figure 3:
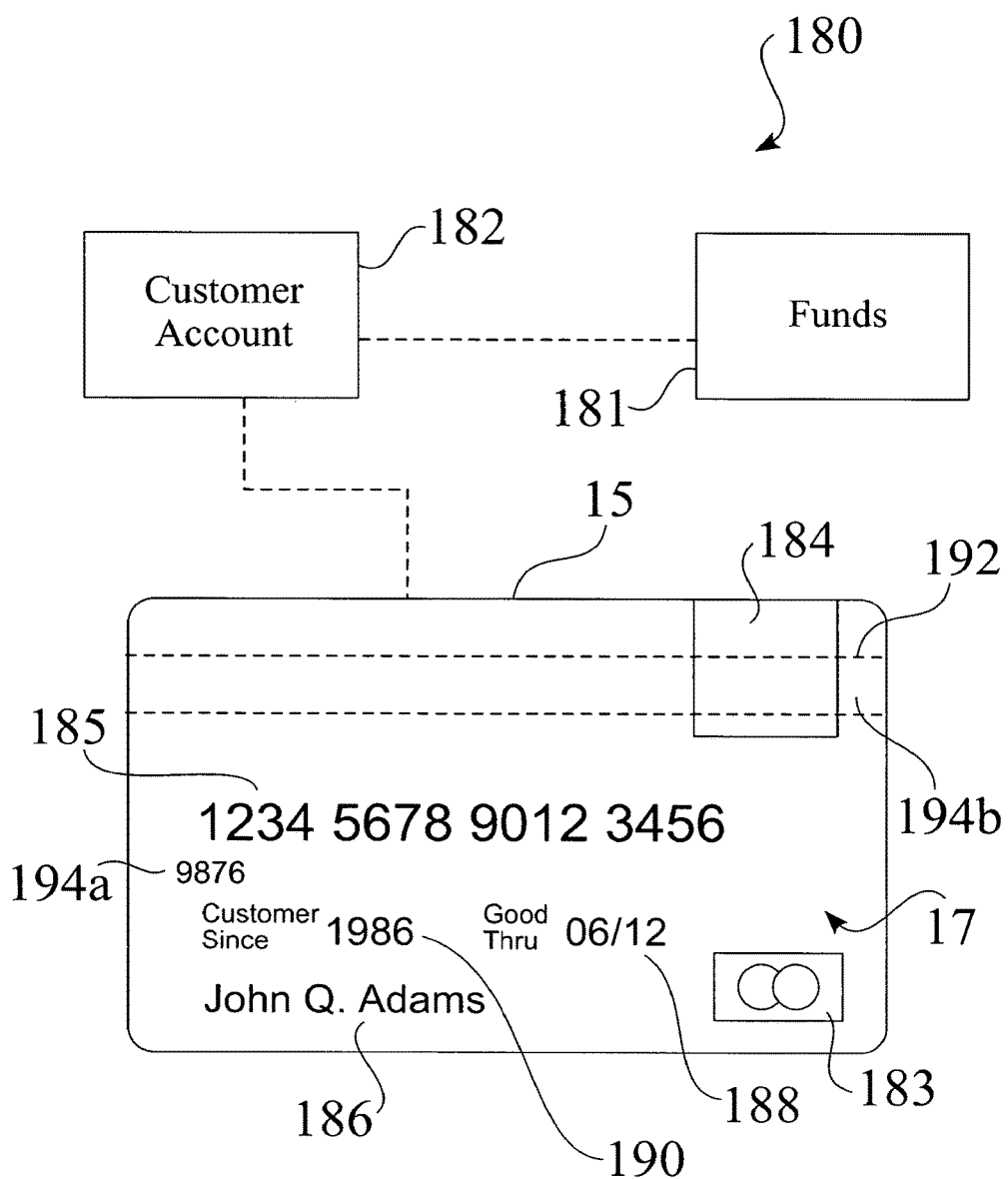
FIG. 3 is an exemplary schematic diagram of an access device associated with a customer account.

In a typical example, a customer user USR applies for and is issued a credit or check card 15, wherein a credit card accesses a line of credit, while a check card accesses the consumer's available funds 181 (FIG. 3). A customer user USR is authenticated when they apply for and are approved for an account 182. The access device 15 is typically mailed or otherwise provided to the customer user USR, wherein the access device 15 is typically provided with a sticker on it, which typically includes a phone number to call and/or an email address, to contact to activate the access device 15, wherein a customer user USR can activate their account 182 and/or select a PIN number or other access number.

Instructions 30 associated with the access device 15 are also provided to the customer user USR, such as related to any of personal identification number(s), limits, and/or one or more card codes 194, e.g. 194a,194b (FIG. 3), such as card security codes (CSC) or card validation codes (CVC). For example, typical card validation codes 194 may comprise a CVC 194b that is encoded on a magnetic stripe 192 (FIG. 3) located on the access device 15, and/or a CVC 194a printed on the card 15 but not encoded on the magnetic stripe 192.

Institutions 12, such as financial institutions (FI) 12 and/or other organizations 12 typically issue consumers or businesses USR with access "devices" (credit cards, debit cards etc.). Authorized users USR of such access devices 15 can then make purchases and/or obtain financial instruments remotely, e.g. such as at a merchant, i.e. point of sale 20, through a dedicated terminal 260 (FIG. 5), e.g. an ATM 260, through a network site 20i (FIG. 12), e.g. an Internet website 20i, or at another remote location.

To use the device 15, the user USR presents the device 15, and/or other account or customer information to a merchant 20 to purchase or acquire goods, services or funds, such as through a physical, i.e. "brick and mortar" store 20, through an Internet site 20i, or through a dedicated terminal or kiosk.

The system 10 seen in FIG. 1 comprises authorization controls 16, that are set, i.e. established 32,34 for account use and access, through the institutional issuer 12 and/or an optional service provider 14, such as to manage, i.e. minimize, fraudulent use of access devices 15 and/or related account information, e.g. PIN numbers. The authorization controls 16 are typically established according to rules of networks and/or the service provider 14, and may include predictive methods to approve or decline authorization requests.

As seen in FIG. 1, and authorized user USR presents 50a access device information to a merchant entity 20, such as by physically presenting the access device 15 to a store clerk CLK (FIG. 10), by physically sliding the access device through a point of sale (POS) terminal 414, or otherwise providing access device information to a merchant entity 20, e.g. communicating over a telephone or entering information through a network connection.

Before providing the goods, services or funds, the merchant 20 first attempts 52 to authorize 60 the transaction, either through a terminal 414 (FIG. 10) or by other means. In the authorization process, the merchant 20 must follow certain guidelines, including providing information from the presenter of the device 15. If the authorization is approved, the merchant 20 provides the goods, services or funds 70, e.g. a bicycle 70.

The merchant authorization request 52 is performed through interaction with the system 10, such as through communication with the institutional issuer 12, or through one or more intermediate entities in the system 10. For example, as seen in FIG. 1, the merchant 10 may send an authorization request 52 through a financial entity 22, e.g. a bank, associated with the merchant 20, wherein the authorization request 52 includes information associated with the access device 15, e.g. such as the account number 185, and may preferably also include a CVC number 194. The request also typically includes merchant information and transaction information, e.g. such as the amount of the requested transaction.

An authorization request 52 may then typically initiate a transmission 57,58 of information between a merchant bank 22 through an association payments network 24, such as to the institutional issuer entity 12, or to a service provider 14 that provides service functions for the institutional issuer entity 12. In response to the transaction authorization request, the service provider 14 or the institutional issuer 12 determines 56 an appropriate response 60, such as to approve or decline the request for funds 181 (FIG. 3), wherein the decision 56 is based on the institutionally established set of rules 16, such as comprising the institutional rules, the network rules, and/or rules that are based on the predictive models.

If the funds are approved, a notification 60 that indicates approval is typically sent to the merchant 20, such that the user USR is able to receive 62a the goods or services 70, while funds 181 associated with the transaction 62a typically flow 58 from the issuer 12, e.g. Wells Fargo Bank, to the financial entity 22, e.g. a bank 22 associated with the merchant 20.

In the exemplary system 10 seen in FIG. 1, an authorized user USR may potentially be denied the transaction, based on an authorization decline 56. A decision 56 to decline the transaction request 52 that is based on the institutionally established rules 16 may be an intended result, such as for a transaction 62 that exceeds the available limit of an account 182 (FIG. 3) associated with a customer user USR, or for a transaction that falls within a threshold of a predictive model, e.g. such as wherein the transaction appears to be fraudulent based on an institutional rule.

However, a decision 56d based solely on institutionally established rules 16, may be associated with a false positive, such as for a user USR who appears to be making out of pattern transactions, such as based upon the predictive modeling from the institutional issuer 12, or based upon other authorization system controls that result in the institutional issuer 12 either declining the transaction, or providing some other type of qualifying response such as "Contact Issuer".

The latter response may result in the customer user USR selecting and/or using a competing financial institution's product for this and/or subsequent transactions, because of the customer user USR or the merchant's 20 real or perceived inconvenience from the non "approved" response 60. In this case, the transaction would be a false positive for those portions of transactions where it was in fact the customer USR attempting to use the account.

In other instances, "false positives" can occur where institution issuers 12 have experienced increased fraud for certain types of transactions e.g. for gas purchases greater than a threshold dollar amount, e.g. $100, transactions in certain geographies that have been experiencing increased incidences of fraud or for accounts with account numbers in account number ranges that the institutional issuer 12 may have reason to believe may be compromised due to some type of real or presumed data security breach.

In recent years many publicized security breaches, either through stolen or lost data, have resulted in reissuance of account numbers by financial institutions 12, and/or declining transactions that would otherwise be approvable, absent concerns that the account identifying and/or access information may have been compromised.

As also seen in FIG. 1, a user FRD, e.g. a fraudster FRD, other than an authorized user USR, may also interact 50u, 62u with the system 10. For example, access devices 15 and/or information associated with access devices 15, e.g. account numbers 185, user names 186, expiration dates 188, and/or CVC numbers 194, may be compromised, such as due to a lost or stolen card 15 and/or identity theft.

In the system seen in FIG. 1, an alternate user FRD may readily use, e.g. submit 50u an access device 15 and/or information associated with the device 15, such as to receive goods and/or services 70, cash advances, or otherwise transfer funds 181 from the customer account 182. Since user interaction with the system 10 is based on institutional rules 16, as long as the proper customer user USR has not discovered an existing problem with the access device and has not taken steps to prevent further account use, e.g. by calling the issuer to report the problem, a fraudster FRD may easily use the device 15, as long as the transaction(s) comply with the institutional rules 16.

As seen in FIG. 1, a merchant 20 would typically follow the same procedure to authorize a transaction for an unknown user FRD, such as a suspected fraudster FRD. As long as the fraudster FRD provides 50u all the required information in regard to the access device 15 and/or account 182, the fraudster FRD may easily obtain goods and/or services 70, cash advances, or otherwise transfer funds 181 from the customer account 182, as long as the transaction(s) comply with the institutional rules.

For example, if an account in good standing has available funds 181 of $5000, and has a cash advance limit per day of $300, a fraudster FRD may readily conduct one or more transactions 50u, 62u equaling less than or equal to the $5000, and/or may make one or more cash advances totaling less than the established $300 per day, without system notification to or approval of the proper customer user USR.

Such illegitimate transactions can be made through a wide variety of merchants 20 to purchase goods, services or funds 70, such as through a physical, i.e. brick and mortar, store 20, through an Internet site 20, through an ATM 260 (FIG. 10), or over the phone to a business or catalog merchant 20.

Misuse of access devices 15 for fraudulent purposes has materially negative consequences for users USR of the devices, for the issuers 12 of the devices, and for any other entity that can be negatively impacted by either actual or perceived security risks. Users USR are often negatively affected, such as but not limited to any of identify fraud, loss of access to funds 181, and inconvenience. As well, providers of such access devices 15 lose millions of dollars annually to fraudulent device use.

For example, if at a later time it is determined that a receiver FRD of the goods, services or funds 70 was a "fraudster" FRD, the system 10 has been defrauded, with various negative consequences such as comprising any of:
  the access device 15 can be shut down;
  the consumer USR may be materially inconvenienced and/or suffer financial loss;
  the provider of the device 15 or the merchant 20 suffer financial loss; and/or
  confidence in the payments system 10 is negatively impacted.

Figure 2:
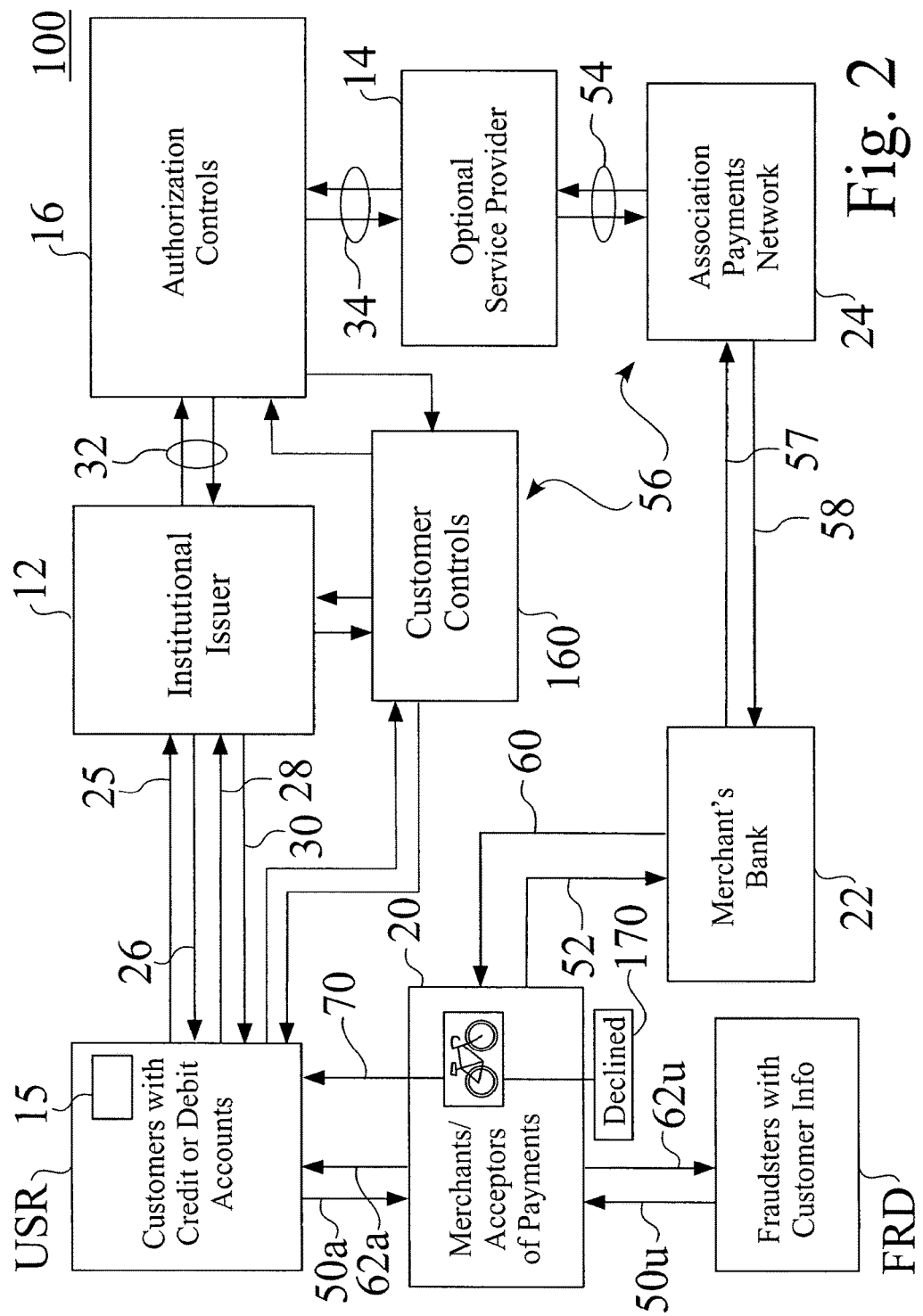
FIG. 2 is a schematic view of one embodiment of an enhanced financial account system, wherein at least a portion of rules associated with account operation are controlled by an authorized customer of the account.

FIG. 2 is a schematic view of one embodiment of an enhanced financial account system 100, wherein at least a portion of rules associated with account operation are controlled by an authorized customer user USR of the account 182. The customer typically comprises an account holder or a person that is deemed to be accountable or liable for the actions of account holders, or other account users authorized by the account holder to access the account 182. Typically, consumer accounts 182 have one or more account holders that are liable for incurred debt. One such account holder is often considered a "primary" account holder, which is primarily a function of limitations on issuer systems 12 that capture social security numbers, etc., from only one of the authorized users.

In the customer controllable process and system 100, the customer user USR manages additional controls 160, such as via any of online 244 (FIG. 5), through an ATM 260 (FIG. 5), and through phone communication 256 (FIG. 5), to any of the issuer 12, e.g. Wells Fargo Bank, such as though a network interface between a user terminal 250 (FIG. 5) and an issuer computer, terminal, server, computing system, electronic system, or network site 12, and/or to an associated service provider 14, e.g. an associated service provider computer, terminal, server, computing system, electronic system, or network site 14, or through an interface associated with the rules 16,160.

In some embodiments of the customer controllable process and system 100, any of the liable account holders for an account 182 are able to set authorization parameters and/or may designate other authorized users to do so. For example, authorized users or "additional" account holders are not liable for the account debt, and may be restricted from setting account parameters 160, such as by one or more of the "account holders", or by an institutional issuer 12 that makes the customer controllable process and system 100 available to its customers USR.

FIG. 3 is an exemplary schematic diagram 180 of an access device 15 associated with a customer account 182, which can be used in either the basic transaction system 10 or the customer controllable process and system 100. As seen in FIG. 3, an access device 15 associated with a customer account 182 typically comprises one or more cards 17, such as for one or more intended, i.e. approved customer users USR for the account 182, e.g. for one or more account holders USR, and as allowed, for one or more account users USR that are authorized by the account holder(s) to access the account 182, such as for a spouse, child, or employee.

Each of a access devices 15 typically includes information that appears on the card 17, such as but not limited to an account number 185, a user name 186, indicia relating to card type 183, indicia 184 relating to the issuer 12, an expiration, i.e. good thru date 188, other information 190, and typically including encoded information, such as within a magnetic region, e.g. a stripe 192.

While an access device 15 associated with a user account 182 in the customer controllable system 100 may preferably appear to be identical to a conventional credit card or debit card 15 for a basic transaction system 10, an access device 15 in the customer controllable system 100 is issued with enhanced security features and processes that allow customer users USR to control circumstances under which their account 182 can be accessed. Therefore, if a fraudster FRD tries to access the account 182 without knowledge and/or access to the consumer set controls 160, the enhanced system 100 can quickly take remedial action, with reduced instances of false positives.

In some embodiments, the customer user USR can change the customer controlled rule parameters 160 at any time, and there is no way for a fraudster FRD to know either the current user-controlled parameters, or of updates to the user-controlled parameters.

An issuer 12 may preferably contact the customer user USR, e.g. as soon as possible, if an authorization attempt 50, e.g. 50u, is outside the customer-controlled parameters 160. For example, if the customer USR is contacted through a real time phone conversation, the customer user USR and/or the issuer administrator ISR (FIG. 5) associated with the issuer computer 12 can reset the parameter 282 or rule 160 if desired, such as to resubmit 50 and approve 62 a transaction.

As seen in FIG. 2, and authorized customer user USR may present 50a access device information to a merchant entity 20 in a similar manner to the basic system 10 seen in FIG. 1, such as by physically presenting the access device 15 to a store clerk CLK (FIG. 10), by physically sliding the access device 15 through a point of sale (POS) terminal 414, or otherwise providing access device information to a merchant entity 20, e.g. communicating over a telephone, entering information through a network connection, or otherwise presenting account information, e.g. a key fob, a chip in a cell phone, a mini card, a contactless card, or other means or device for conveying account information.

Before conditionally providing the goods, services or funds, the merchant 20 must first similarly authorize the transaction, either through a terminal 414 (FIG. 10) or by other means. In the authorization process, the merchant 20 follows certain guidelines, including providing information from the presenter of the device 15. If the enhanced authorization determination 56 is approved, e.g. through merchant notification 60, controllably based on both the primary rules 16 and the customer-controlled rules 160, the merchant 20 similarly provides the goods, services or funds 70.

The merchant authorization request 52 is performed through interaction with the enhanced system 100, such as through communication with the institutional issuer 12, or through one or more intermediate entities in the system 100. For example, as seen in FIG. 2, the merchant 20 may send an authorization request 52 through a financial entity 22, e.g. a bank, associated with the merchant 20, wherein the authorization request 52 includes information associated with the access device 15, e.g. such as the account number 185, expiration date 188, and may preferably also include a CVC number 194. The request also typically includes merchant information and transaction information, e.g. such as the amount, the date and the time of the requested transaction.

An authorization request 52 may then typically initiate a transmission 57,58 of information between a merchant bank 20 through an association payments network 24, such as to the institutional issuer entity 12, or to a service provider 14 that provides service functions for the institutional issuer entity 12. In response to the transaction authorization request, the service provider 14 or the issuer 12 determines 56 an appropriate response 60, such as to approve or decline the request for funds, wherein the decision 56 is based on both:

the institutionally established set of rules 16, such as comprising the financial institution rules, the network rules, and/or rules that are based on the predictive models; and customer-controlled rules 160.

In the enhanced system 100, the institutional issuer 12 works as needed with the optional service provider 14 to overlay additional customer rules 160, e.g. selected decline reasons, on top of existing issuer controls, i.e. rules 16.

If the funds are approved 56 in the enhanced system 100, an approval notification 60 is typically sent to the merchant 20, such that the user USR is able to receive 62*a* the goods or services 70, while funds 181 from the customer account 182 associated with the transaction 62*a* typically flow 58 to the financial entity 22, e.g. bank 22 associated with the merchant 20.

As also seen in FIG. 2, a user FRD, e.g. a fraudster FRD, other than an authorized user USR, may also attempt to interact 50*u*,62*u* with the enhanced system 100. For example, access devices 15 and/or information associated with access devices 15, e.g. account numbers 185, user names 186, expiration dates 188, and/or CVC numbers 194, may be compromised, such as due to a lost or stolen card 15 and/or identity theft.

In the system seen in FIG. 2, an alternate user FRD may attempt to use, e.g. submit 50*u* an access device 15 and/or information associated with the device 15, such as to attempt to receive goods and/or services 70, cash advances, or otherwise transfer funds 181 from the customer account 182, such as by physically presenting the access device 15 to a store clerk CLK (FIG. 10), by physically sliding the access device 15 through a point of sale (POS) terminal 414, or otherwise providing access device information to a merchant entity 20, e.g. communicating over a telephone, entering information through a network connection, or otherwise presenting account information, e.g. a key fob.

Before conditionally providing the goods, services or funds, the merchant 20 sends an authorization request 52, either through a terminal 414 (FIG. 10) or by other means. In the authorization process, the merchant 20 follows certain guidelines, including providing information from the presenter of the device 15. If the enhanced authorization determination 56 is approved, e.g. through merchant notification 60, controllably based on both the primary rules 16 and the customer-controlled rules 160, the merchant 20 similarly provides the goods, services or funds 70.

However, if the fraudster FRD attempts a transaction 50*u*, and provides all typically required account information, the transaction may be prevented 170 if the transaction is not allowed, based on one or more of the customer-controlled rules 160 or associated parameters 282 (FIG. 6), even if the requested transaction 50,52 appears to be allowable based solely on the institutional rules and/or guidelines 16.

Figure 4:
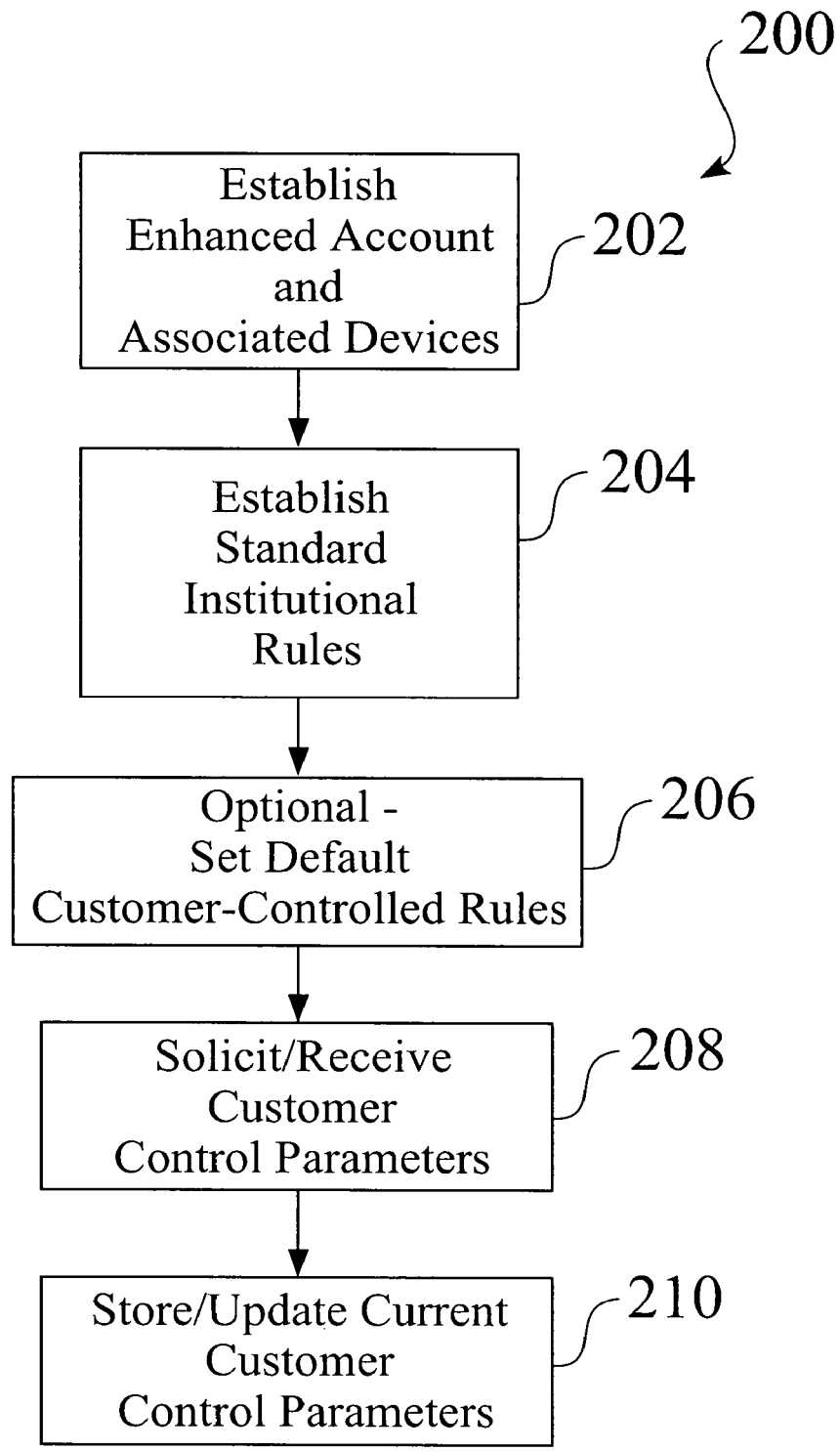
FIG. 4 is a flowchart of an exemplary process for the establishment of a customer-controlled account.
Figure 5:
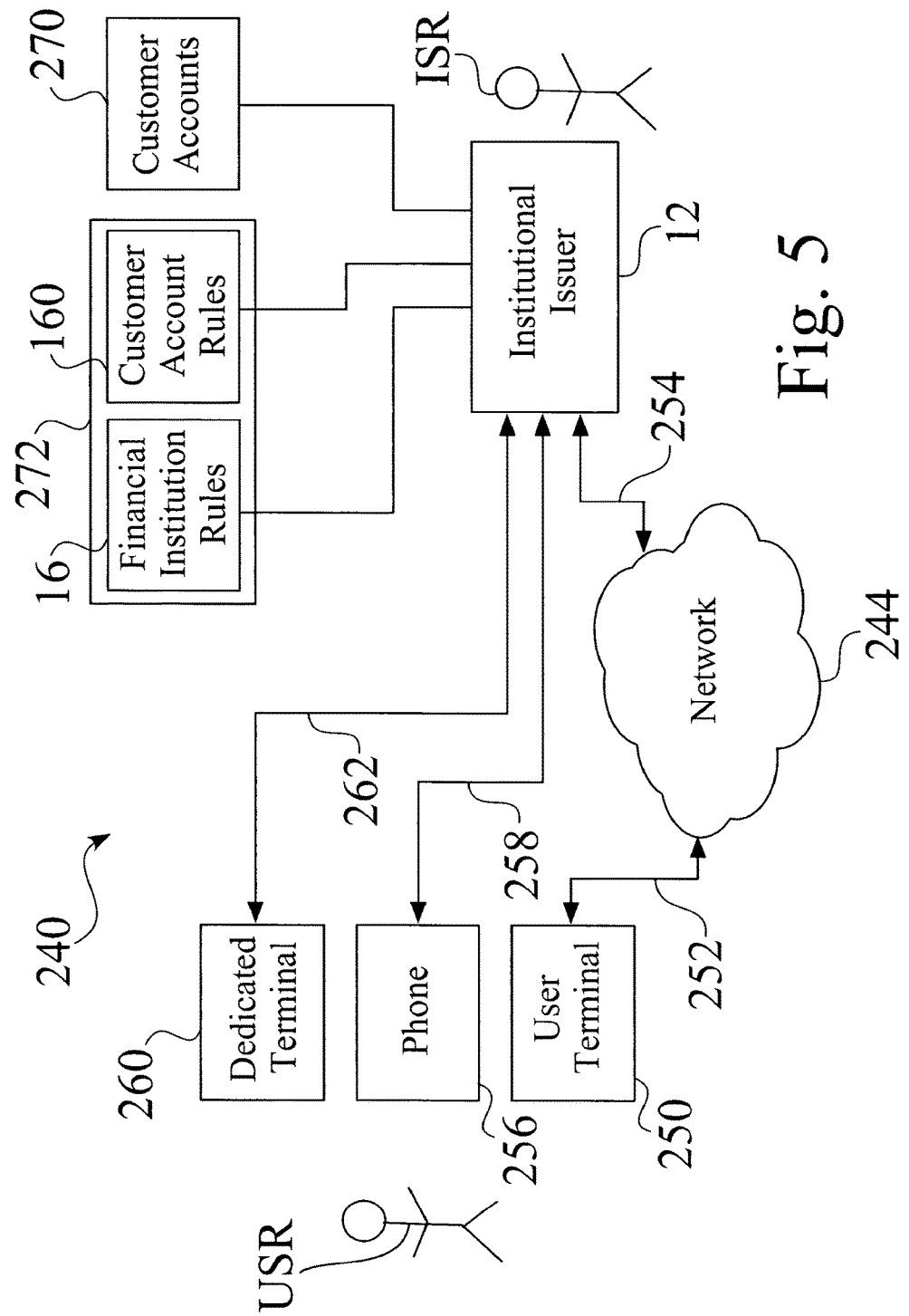
FIG. 5 is an exemplary schematic diagram of solicitation and input of user controls implemented across a network.
Figure 6:
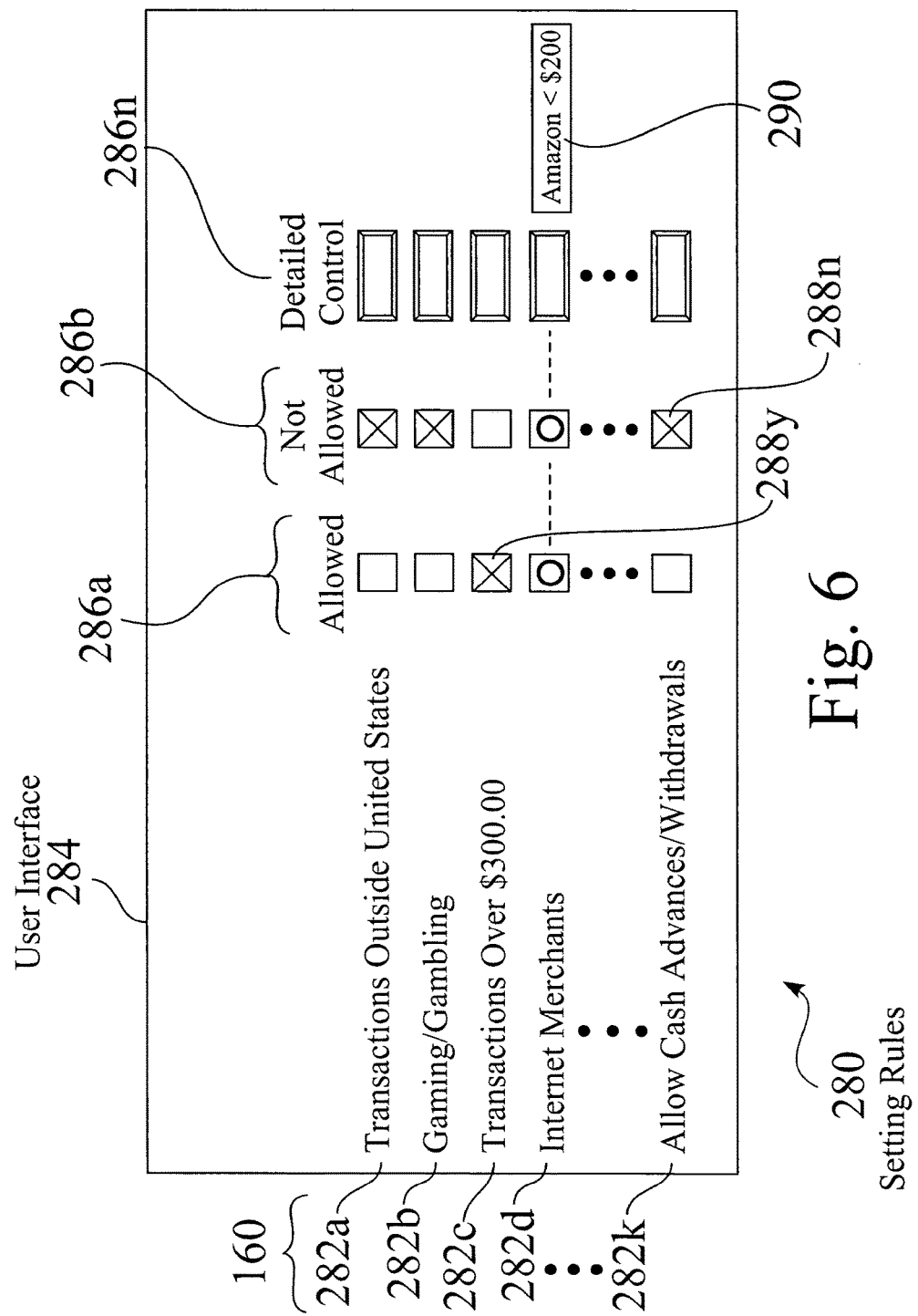
FIG. 6 is a schematic diagram of customer controlled account rules.

Establishment of Enhanced Account and User Controls. FIG. 4 is a flowchart of an exemplary process 200 for the establishment of a customer controlled account 182. FIG. 5 is an exemplary schematic diagram 240 of solicitation and/or alternate input of user controls 160 implemented within the enhanced transaction system 100. FIG. 6 is a schematic diagram 280 of customer-controlled account rules 160 within the enhanced customer-controlled transaction system 100.

The exemplary process 200 for the establishment of a customer controlled account 182 seen in FIG. 4 typically comprises the establishment of an account 182 and assignment of one or more associated access devices 15. In coordination with the establishment 202 is the establishment or assignment 204 of the primary institutional, rules 16 that govern the proper use of the access device(s) 15.

As noted above, the customer controlled account 182 is additionally governed by customer-controlled rules 160, which may initially be pre-set 206 before or during card activation 26,28,30. As well, a customer user USR, such as during or subsequent to initial activation 26,28,30, may set or change 208 the customer-controllable parameters 160, which are then stored or updated 210, such as for reference by the issuer 12 and/or service provider 14 for conditional authorization of a transaction request 52.

For example, cards or access devices 15 may preferably be issued with access to foreign countries turned off. During an activation call 28,30, the customer USR may preferably be asked if they would like to turn such access on, and be provided with instructions as to where and how the customer USR can change and/or modify additional customer-controllable functions 160.

In some system embodiments 100, one or more customer-controllable rules 160 are preferably available for customers through an online terminal 250 (FIG. 5), with an option to phone in 256 (FIG. 5) change requests after verifying the identity of the customer user USR. As well, online screens, e.g. 284 (FIG. 6) may preferably allow the customer USR to turn on or off more restrictive access controls 16 than what the institutional issuer 12, e.g. Wells Fargo, allows.

For example, while the institutional issuer 12 may permit a customer to access up to $500 per day under certain circumstances, i.e. based on an issuer rule 16, the enhanced customer-controlled account system 100 may preferably allow the customer USR to set this limit to a lower amount, e.g. $400 per day, but not a higher amount, e.g. $600 per day.

In some system embodiments 100, the customer user USR may preferably set and/or change a wide variety of parameters 282 or rules 160, such as related to time parameters and/or different limits for different access devices or methods, such as but not limited to:

a maximum of $500 for one card 17 that accesses the account 182 and a higher amount for another card 17 that accesses the account 182;

$0 threshold for jewelry or gambling purchases;

no access to be allowed between defined dates, e.g. between 30 Jun. 2007 and 15 Jul. 2007;

no access to be allowed between 12 am and 6 am PT; and/or no access to card not present situations (phone orders or internet orders).

The consumer controls 160,282 may preferably be extended to any variable that the issuer 12 can restrict access on. The customer user USR may therefore become a much more active contributor to protecting their account, funds and identity.

A customer user USR may interact with the institutional issuer 12, i.e. financial institution 12, such as seen in FIG. 5, or through an associated service provider 14, in a wide number of ways to enter or update user controls 160 within the enhanced transaction system 100. For example, a customer user USR may input or update rules 160 through any of a phone 256 connected 258 to the enhanced system 100, through a dedicated terminal 260, e.g. an ATM connected to the enhanced system 100, or through an alternate device 250, such as any of a user device, computer, or portable digital assistant (PDA), or other terminal 250 connected to the enhanced system 10. As seen in FIG. 5, the connection between a user terminal 250 and the enhanced transaction system 100 may comprise a network 244, e.g. the Internet 244, a client connection 252, an administrative connection 254, and an issuer computer or server 12.

FIG. 6 is a schematic diagram 280 of customer-controlled account rules 160 within the enhanced transaction system 100. While the customer-controlled rules 160 may be physically entered by an administrative user ISR, the exemplary user interface 284 may comprise any of a user entry screen 284 and/or an administrative entry screen 284. The exemplary customer-controllable rules displayed in the entry screen 284 seen in FIG. 6 comprise one or more user-controlled parameters 282, such as but not limited to parameters associated with any of transactions outside the United States 282a, gaming/gambling transactions 282b, transactions over a specified maximum 282c, e.g. $300.00, transactions through Internet merchants 282d, and/or transactions for cash advances, i.e. withdrawals 282k.

Online screens 284, such as seen in FIG. 6, allow the customer user USR to set and modify the access controls that are available to them. In some embodiments 100, the screens 284 may preferably be accessed via secured Internet protocols, such as through a user terminal 250. Customer access to customer-controllable rules 160 may preferably be more limited for selecting additional controls 160, and may preferably be made available via any secure method for interacting with the institutional issuer 12, such as via any of a phone, an ATM, a personal digital assistant device (PDA), and directly with personnel associated with the issuer, e.g. bank personnel.

As seen in FIG. 6, one or more of the customer-controllable parameters 282 may be selectably allowed 286a, not allowed 286b, or otherwise controlled 286n. such as through a selection 288, e.g. an affirmative selection 288y, a disallowed selection 288n, or through a detailed selection or entry 290.

For example, in the exemplary interface shown in FIG. 6, an authorized user USR has not allowed 286b gaming or gambling transactions 282b. As well, the authorized user USR has selected detailed control 286n to allow transactions only from one or more specified Internet merchants, e.g. for transactions of less than $200 from Amazon.com are controllably allowed by the customer user USR. Similarly, a user USR that plans a vacation to a foreign destination, e.g. Tahiti, may selectably allow transactions from foreign merchants 20 located in their destination within their dates of travel, while disallowing transactions from other countries, and optionally also disallowing transactions in Tahiti for dates other than their dates of travel.

In some embodiments of the enhanced transaction system, one or more of the customer users USR may preferably control the rules 160 to preferably control, allow, or limit one or more parameters 282 differently between one or more access devices 15 associated with the user account 182. For example, a parent customer user USR may limit one or more parameters 282 for a credit card 15 used by a college-bound son or daughter, such as to limit cash withdrawals, or to disallow certain transactions, such as based on store, product category, service category, location, date, transaction amount, or cumulative cost, e.g. not more than $300 per month.

Figure 7:
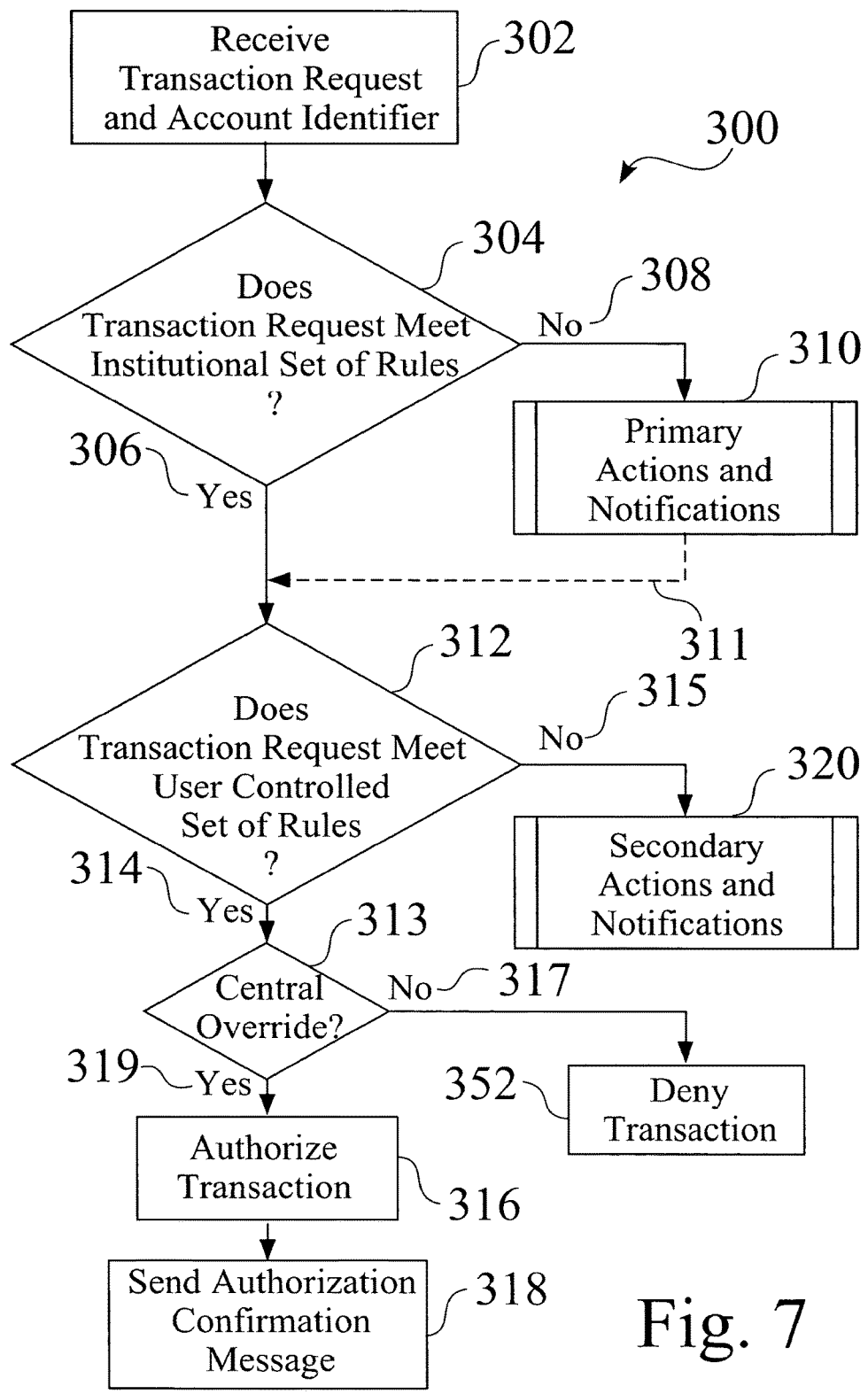
FIG. 7 is a flowchart of an exemplary process for response to a transaction request associated with a customer-controlled account.
Figure 8:
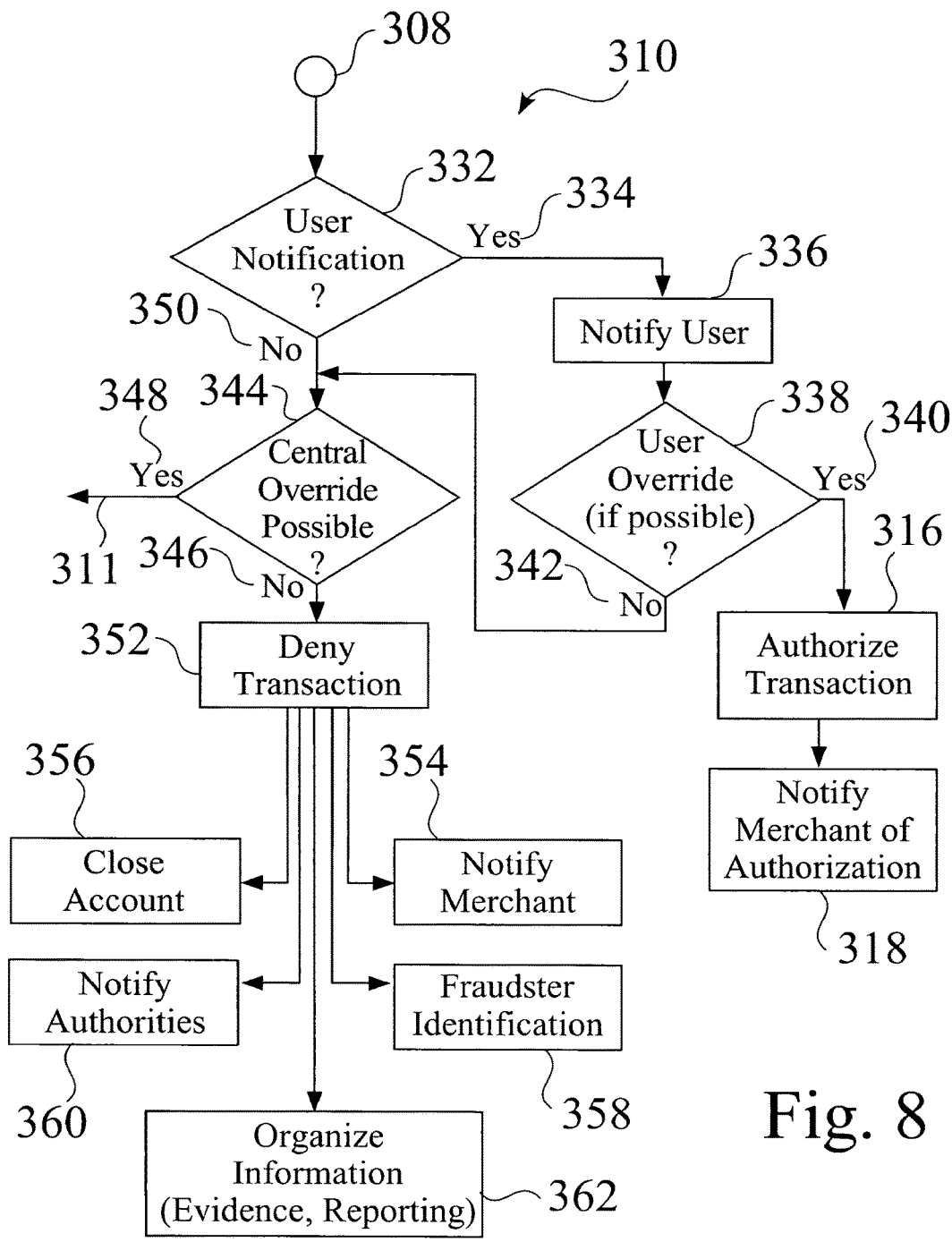
FIG. 8 is a flowchart of an exemplary process for actions and/or notifications associated with non-compliance of a transactional request with primary or institutional rules.
Figure 9:
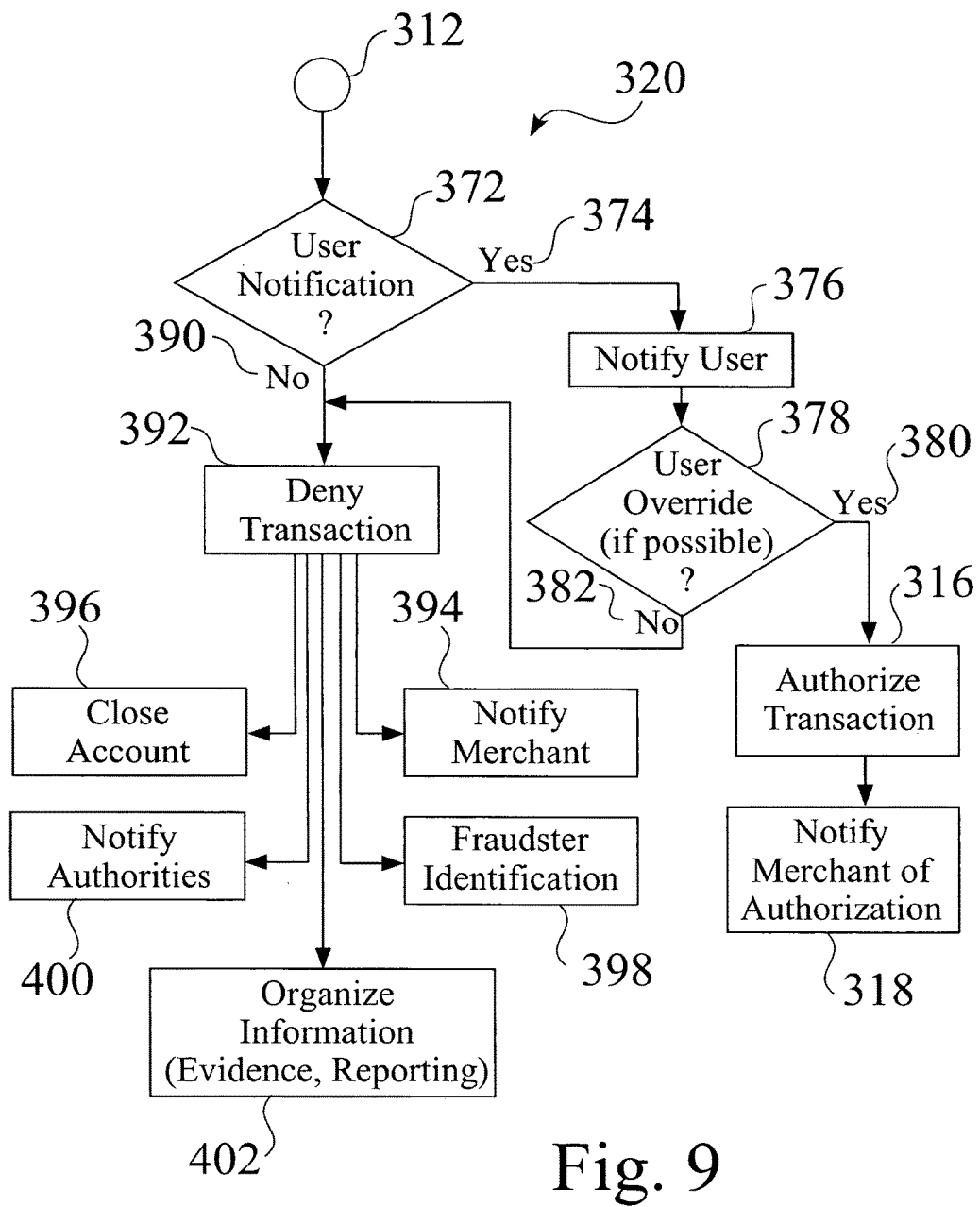
FIG. 9 is a flowchart of an exemplary process for actions and/or notifications associated with non-compliance of a transactional request with secondary or customer controlled rules.

Transaction Processing for Enhanced Customer-Controlled Accounts. FIG. 7 is a flowchart of an exemplary process 300 for system response to transaction requests associated with a customer-controlled account 182. FIG. 8 is a flowchart of an exemplary process 310 for actions and/or notifications associated with non-compliance of a transactional request with primary or institutional rules 16. FIG. 9 is a flowchart of an exemplary process 320 for actions and/or notifications associated with non-compliance of a transactional request with secondary or customer-controlled rules 160.

As seen in FIG. 7, a transaction request, e.g. 52 is received 302, wherein the transaction request 52 typically comprises account information as well as any of merchant information, transaction amount, date, time, and product or service category. A determination 304 may be made whether the request 52 meets the primary set of rules 16, e.g. such as the centralized rules controlled by the institutional issuer 12, i.e. financial institution (FI) 12, or other service provider 14. If not 308, the enhanced system 100 may perform 310 one or more actions and/or notifications based at least on the primary rules 16, such as to simply deny 352 the transaction request 52 (FIG. 8).

After or concurrently with performing the primary action and/or notification subroutine 310, the process may return 311 to the main process 300, such as to additionally check 312 for adherence to customer controls 160, such as to provide a secondary level of account protection.

For example, a potential fraudster FRD may have attempted a transaction that does not meet an issuer rule 16, e.g. over a transaction limit, and additionally does not meet a customer-controlled rule 160, e.g. gambling that is disallowed by the user USR. In this example, the transaction request 52 is declined 56 based on the primary, i.e. institutional, set of rules 16, but because of the customer-controlled rule 160 or parameter 282, the institutional issuer 12, customer user USR, or other interested party, e.g. an associated service provider 14 or police, may be alerted that there may be a fraudulent situation going on. The customer controlled account system 100 and process 300 therefore provides significant information in a timely manner, which would not be available if the system only acted upon the primary decline reason 56. The customer-controlled rules 160 and/or parameters 282 may therefore provide additional insights to one or more transactions.

In some embodiments of the system 100 and associated process 300, a transaction request 52 may be approved based on customer-controlled rules 160 and/or parameters 282, even though the transaction request 52 may not initially be acceptable based upon the institutional rules 16 alone. For example, for a set of centralized rules 16 that currently disallow transactions in a certain region or country, e.g.

Tahiti, a user USR may provide information to the institutional issuer 12 or associated provider 14, that confirms legitimacy. In such a situation, a user USR may confirm that they are currently located at the region or country, e.g. Tahiti, and the institutional issuer 12 or provider may determine or otherwise decide that the conditions were sufficient to warrant a reversal of a decision.

In current system embodiments 100, if the decline is because the consumer USR is over their credit limit, no consumer setting 160,282 can override that. In such a situation, the notification process may alert the customer USR that they would be over limit (OVL), in which case the customer user USR may decide to make an early payment.

If the determination 304 of whether the request 52 meets the primary set of rules 16 is positive 306, the system 100 may then determine 312 whether the request 52 meets the customer-controlled set of rules 160, e.g. such as the customer-controlled parameters 282 (FIG. 6). If the determination 312 is positive 314, the system 100 may then authorize 316 the transaction, and send 318 a confirmation message 60 toward the merchant 20.

If the determination 312 is negative 315, the system 100 may then perform 320 one or more actions and/or notifications based at least on the secondary, i.e. customer-controlled rules 160, such as to deny 392 (FIG. 9) the transaction, based on non-adherence to one or more customer-controlled rules 160.

As seen in FIG. 8, an authorization entity, such as the institutional issuer 12 or associated service provider 14, may initiate actions and/or notifications associated with non-compliance of a transactional request with primary or institutional rules 16. While some actions and/or notifications may be similar to those in a basic transaction system 10, some actions and/or notifications may be further enhanced based on customer user input.

In the exemplary process, i.e. subroutine 310 seen in FIG. 8, a determination 332 may be made whether a customer user USR is to be notified if a request 52 fails to meet the primary, i.e. centralized rules 16 controlled by the institutional issuer 12, e.g. financial institution (FI) 12 or other service provider 14. If the decision 332 is yes 334, the system 100 may notify 336 the customer user USR, e.g. automatically, such as to a telephone 256 (FIG. 11) associated with the account 182.

For example, in a situation where a the customer USR or store clerk makes a typographical error, or "fat fingers" the entry of the expiration date or CVC value, the transaction request 52 would typically 52 fail to meet the primary, i.e. centralized rules 16 controlled by the institutional issuer 12, e.g. financial institution (FI) 12 or other service provider 14. Upon a notification 336, the customer USR or other person, e.g. clerk, such as over the phone, may confirm the identity of the customer USR. As a result of a notification 336 and subsequent communication, an institutional issuer 12 may allow a transfer of money from another account, e.g. such as possible for a fee, such as in cases where the transaction request 52 is declined because the associated account 182 is over-limit.

Upon notification 336, the system may determine 338 if a system denial override is possible or not, such as based on the issuer 12 and/or the user USR. If yes 340, the transaction may be authorized 316, and a notification 318 may be sent toward the merchant 20. Such an override 340, 316 may be useful, such as for a customer user USR in otherwise good standing that has a valid and immediate need for a product, service, or funds, that is otherwise allowable by the centralized issuer rules 16 as well as the customer-controlled rules 160, e.g. such as for but not limited to an emergency, travel abroad, or limited card use by a child.

If the system 100 determines 338 that a user override is not possible or appropriate 342, the system 100 may then proceed to deny 352 the transaction and notify 354 the merchant 20, and may also take other actions, such as but not limited to closing 356 the account 182, attempting to identify 358 a potential fraudster FRD, notifying 360 authorities, e.g. police, and/or organizing 362 associated information, such as for evidence, reporting, or investigation.

As also seen in FIG. 8, a determination 344 may be made whether a central override is possible 348, e.g. such as in situations where determination 313 (FIG. 7) is made that the transaction request 52 complies 314 with customer-controlled rules 160, and a system decision 313 is made to allow 319 the transaction, even though the transaction request has not complied with all central rules 16. As also seen in FIG. 7, if a central override decision 313, is negative 317, the system may proceed to deny 352 the transaction, and may take one or more actions, e.g. 354, 356, 358, 360, and/or 362, such as seen in FIG. 8.

A central override determination 313 and decision 319 may provide great value for both the system 100 and for customers USR. In one example, an institutional issuer 12 may at one time stop, i.e. disallow, transactions from a designated region or country, e.g. Tahiti, such as due to increased fraud generated from that region or country. While the institutional rules 16 may not 308 be met, the system 100 and process 300 may still check 312 the customer-controlled rules 160 and/or parameters 282. In the above example, if the customer user USR has indicated that they want transactions to be authorized in the region or country, e.g. Tahiti, such as for certain dates, the institutional issuer 12 may preferably override 319 its prior logic 308, either automatically or under manual review, to approve 319 the transaction, such as assuming no other decline reasons take precedence.

System embodiments 100 and associated processes 300 that incorporate a central override determination 313 may allow an institutional issuer 12 to allow more transactions that it would otherwise, even though a common result of the customer controlled system and process is to decline more transactions, based at least in part on the customer-controlled rules 160 and/or parameters 282.

As seen in FIG. 9, an authorization entity, such as the institutional issuer 12 or associated service provider 14, may initiate actions and/or notifications associated with non-compliance of a transaction request with customer-controllable rules 160, which provides significant advantages over prior transaction systems.

In the exemplary process, i.e. subroutine 320 seen in FIG. 9, a determination 372 is made whether a customer user USR is to be notified if a request 52 fails to meet the rules 160 controlled by the customer user USR associated with the account 182. If the decision 372 is yes 374, the system 100 may notify 376 the customer user USR, e.g. automatically, such as through a telephonic connection to a telephone 256 associated with the account 182.

Upon notification 376, the system may determine 378 if a system denial override is possible or not, such as based on the institutional issuer 12 and/or the customer user USR. If yes 380, the transaction may be authorized 316, and a notification 318 may be sent toward the merchant 20. Such an override 380, 316 may be useful for a variety of circumstances, such as:

for a customer user USR that had previously set a customer-controllable rule 160 or parameter 282 to disallow, i.e. prevent, foreign transaction, who then had forgotten to reset the customer-controllable rule 160 or parameter 282 to allow foreign transactions before traveling; or for a customer user USR that had previously set a customer-controllable rule 160 or parameter 282 to disallow, i.e. prevent, a gambling purchase, who then had changed their mind and had forgotten to reset the customer-controllable rule 160 or parameter 282 to allow such a transaction.

The customer user USR may be required to update the rules 160, at least temporarily, such that the transaction complies with the updated customer rules 160.

Such an override 380, 316 may also be useful for a customer user USR in otherwise good standing that has a valid and immediate need for a product, service, or funds, that is otherwise allowable by the centralized issuer rules 16 as well as the customer-controlled rules 160, e.g. such as for but not limited to an emergency, travel abroad, or limited card use by a child. The customer user USR may be required to update the rules 160, at least temporarily, such that the transaction complies with the updated customer rules 160.

If the system 100 determines 378 that an override is not possible or appropriate 382, or if the customer user USR associated with the account 182 is not able to be notified, the system 100 may then proceed to deny 392 the transaction and notify 394 the merchant 20, and may also take other actions, such as but not limited to closing 396 the account 182, attempting to identify 398 a potential fraudster FRD, notifying 400 authorities, e.g. police, or other entities, e.g. interested parties, and/or organizing 402 associated information, such as for evidence, reporting, or investigation.

If the institutional issuer 12 or associated service provider 14 identifies attempts to access the account 182 in a way that the consumer user USR has indicated 160 they wish to prevent, the institutional issuer 12 can be aggressive in restricting such access, because the restriction 160 was customer initiated, and the concern about false positives is greatly reduced.

If an attempt to access the account is made counter to a security setting that either the institutional issuer 12, e.g. bank or the customer user USR established, the financial institution 12, e.g. Wells Fargo, may preferably decline account access, and may preferably quickly contact the customer user USR, e.g. immediately or as soon as possible, via any and all expeditious means, such as by but not limited to any of paging, phoning or emailing the customer user USR, to ascertain whether the attempt was in fact fraudulent.

If the authorization request is confirmed to be fraudulent, the institutional issuer 12, e.g. financial institution 12 may preferably shut down all access to the account 182, such as immediately, and may preferably notify the authorities and/or the merchant 20, as to the fraudulent transaction attempt, thereby potentially improving the chance of catching the fraudster FRD, and initiating steps to provide the customer user USR more timely with a new access device 15,17 to replace the one that had been compromised.

As seen in the exemplary methods shown in FIG. 7, FIG. 8, and FIG. 9, a merchant 20 is able to follow existing rules for authorization, wherein authorization for a fraudster FRD may be declined 60, 392, by the issuer 12 or associated service provider 14 based on the customer-controlled rules 160, and declined 170 (FIG. 2) for any of goods, services, and/or funds, even if such a fraudster FRD has provided all typically required information to the merchant/payee 20.

Therefore, if a fraudster FRD tries to obtain 70 money, merchandise, or services using stolen customer account information, the request may be declined 170 and may preferably investigated if the request 50,52 is outside of the customer set parameters 160,282.

Figure 10:
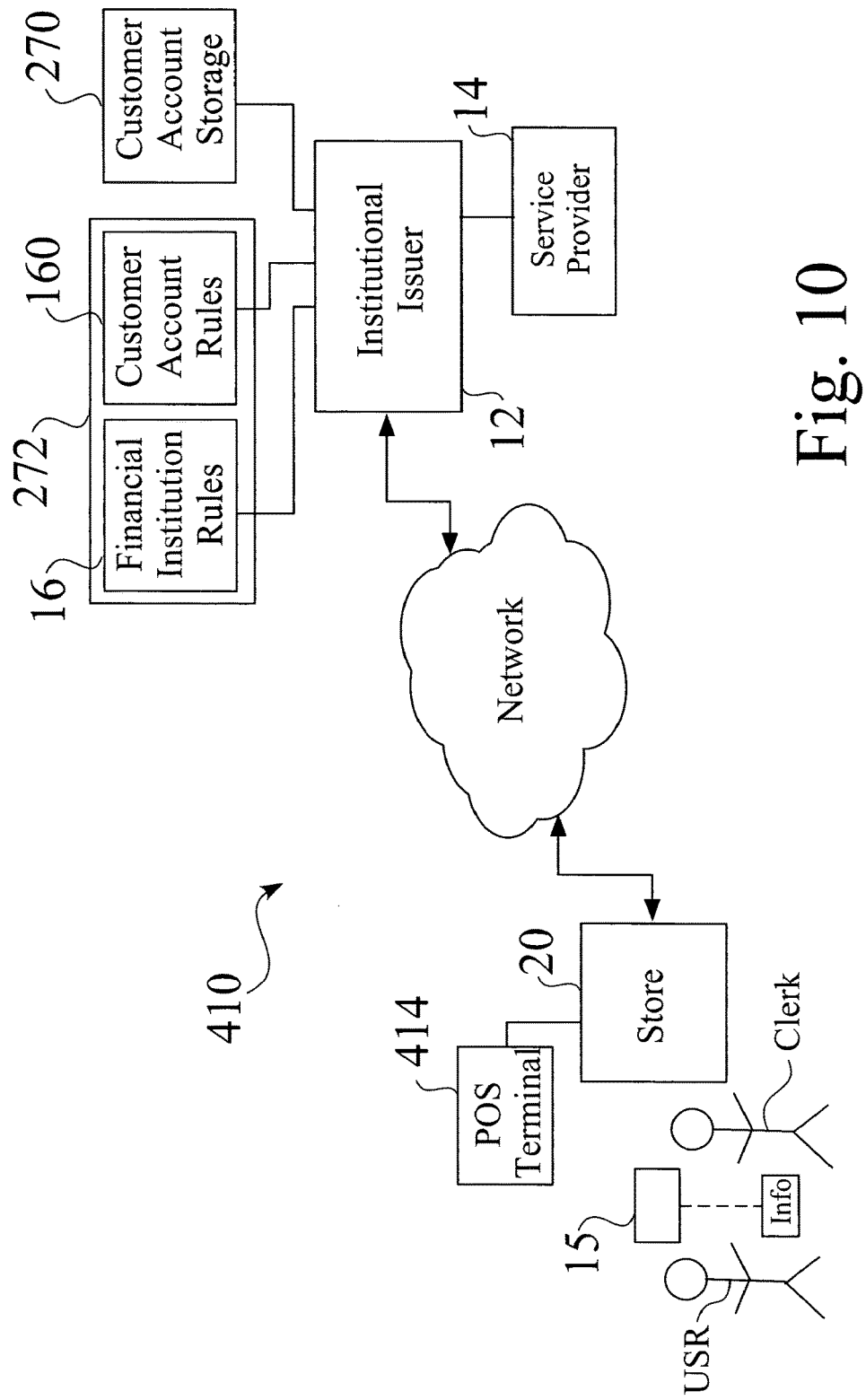
FIG. 10 is a schematic view of an attempted purchase transaction through a "brick and mortar" location, and a request for authorization for an exemplary customer controlled account by an authorized user of the customer-controlled account.
Figure 11:
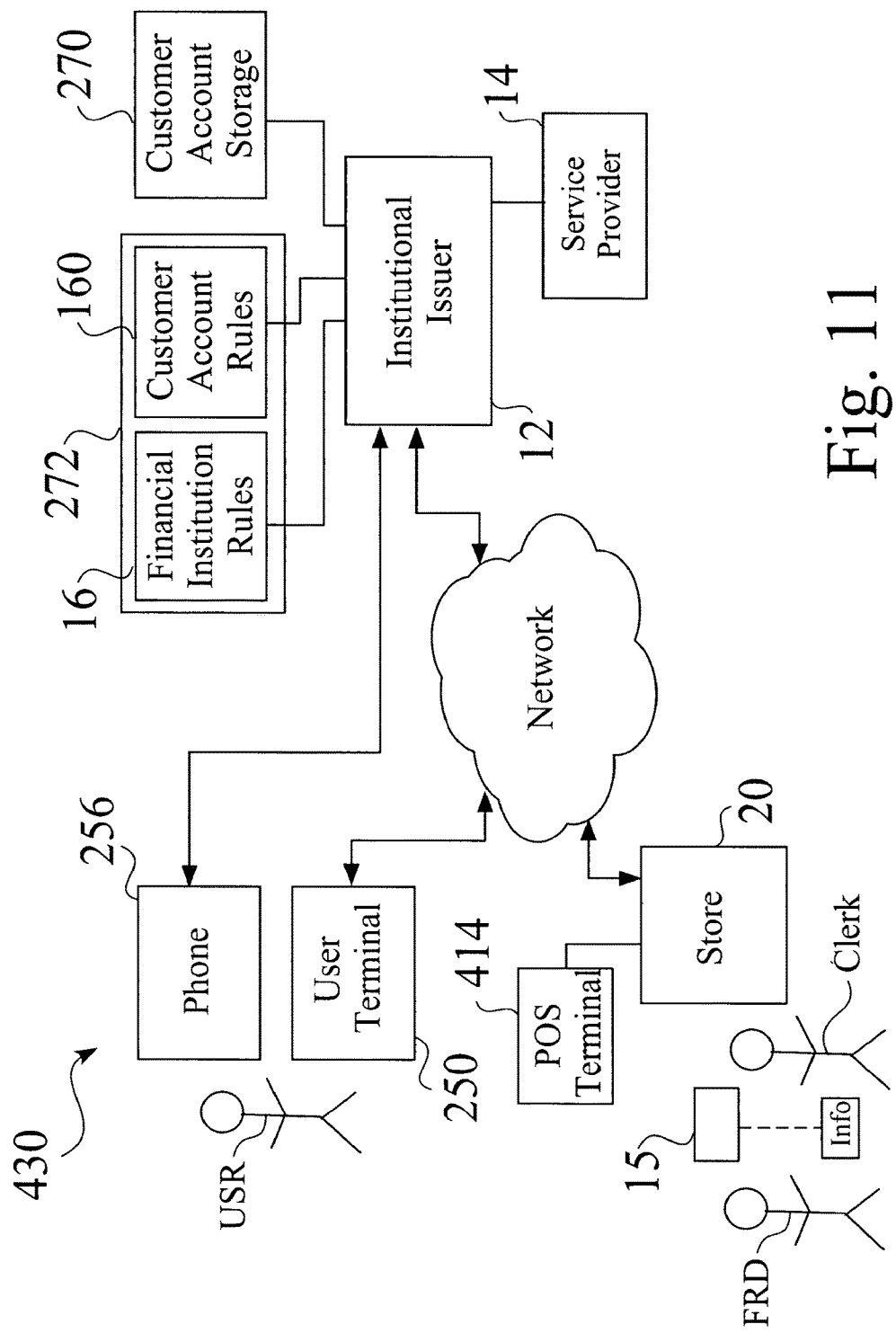
FIG. 11 is a schematic view of an attempted purchase transaction through a "brick and mortar" location, and a request for authorization for an exemplary customer controlled account by an unknown user, e.g. a fraudster, of the customer-controlled account.

FIG. 10 is a schematic view 410 of an attempted purchase transaction through a "brick and mortar" location 20, and a request for authorization for an exemplary customer controlled account 182, by an authorized user USR of the customer controlled account 182. FIG. 11 is a schematic view 430 of an attempted purchase transaction through a "brick and mortar" location 20, and a request for authorization for an exemplary customer controlled account 182 by an unknown user, such as a suspected fraudster FRD, of the customer controlled account 182.

As seen in FIG. 10, a user USR typically provides a clerk CLK with the access device 15, either directly or by interaction through a point of sale (POS) terminal 414. The user may also enter other related information, such as a personal identification (PIN) number through the POS terminal. As noted above, the authorization request 52 is then sent for processing, e.g. 300, such as to the institutional issuer computer 12 or to a service provider computer 14 associated with the institutional issuer 12. If the request 52 meets both the centralized, i.e. financial issuer rules 16 as well as the customer-controlled rules 160, the transaction is typically authorized. If the transaction request is denied due to non-adherence to one or more customer-controlled rules 160, the clerk may prompt the user USR to communicate with the institutional issuer 12 or service provider 14, such as to confirm user identity and to update the customer-controlled rules 160 to allow the transaction.

As seen in FIG. 11, an unknown user FRD may also try to attempt a transaction for products, services, and/or funds through a store 20, such as by presenting a stolen access device 15, or other means to convey information related to the access device 15 and/or account 182. However, if the transaction request is denied due to non-adherence to one or more customer-controlled rules 160, the clerk may prompt the alternate user FRD to communicate with the issuer 12 or service provider 14, such as to confirm user identity, which may not be possible for the unknown user USR. In such a situation, the institutional issuer 12 or service provider 14 may controllably attempt to contact or notify 376 (FIG. 9) the customer user USR, such as by telephone 256, by an approved email account listed for the user USR, or directly though a user terminal 250 associated with the proper user USR, through a secure connection. As described above, the fraudster FRD may be thwarted in their attempt to defraud the system 100, due to non-adherence to one or more customer-controlled rules 160, and be denied 170 (FIG. 2) goods, services, and/or funds 70.

Figure 12:
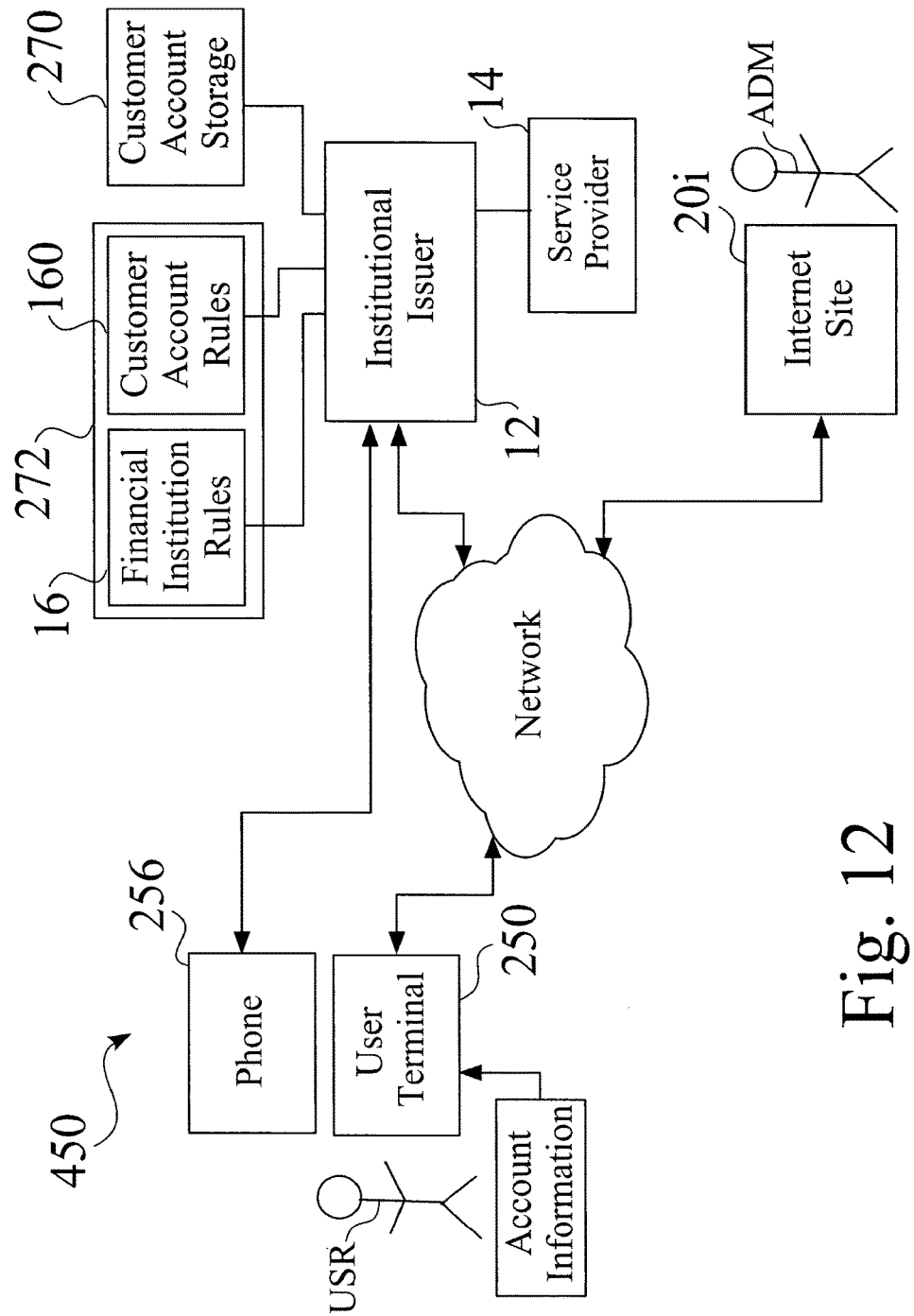
FIG. 12 is a schematic view of an attempted purchase transaction through an internet site, a request for authorization for an exemplary customer controlled account by an authorized user of an access device associated with the customer controlled account, and optional system communication with the customer in response to non-adherence to one or more customer-controlled rules.
Figure 13:
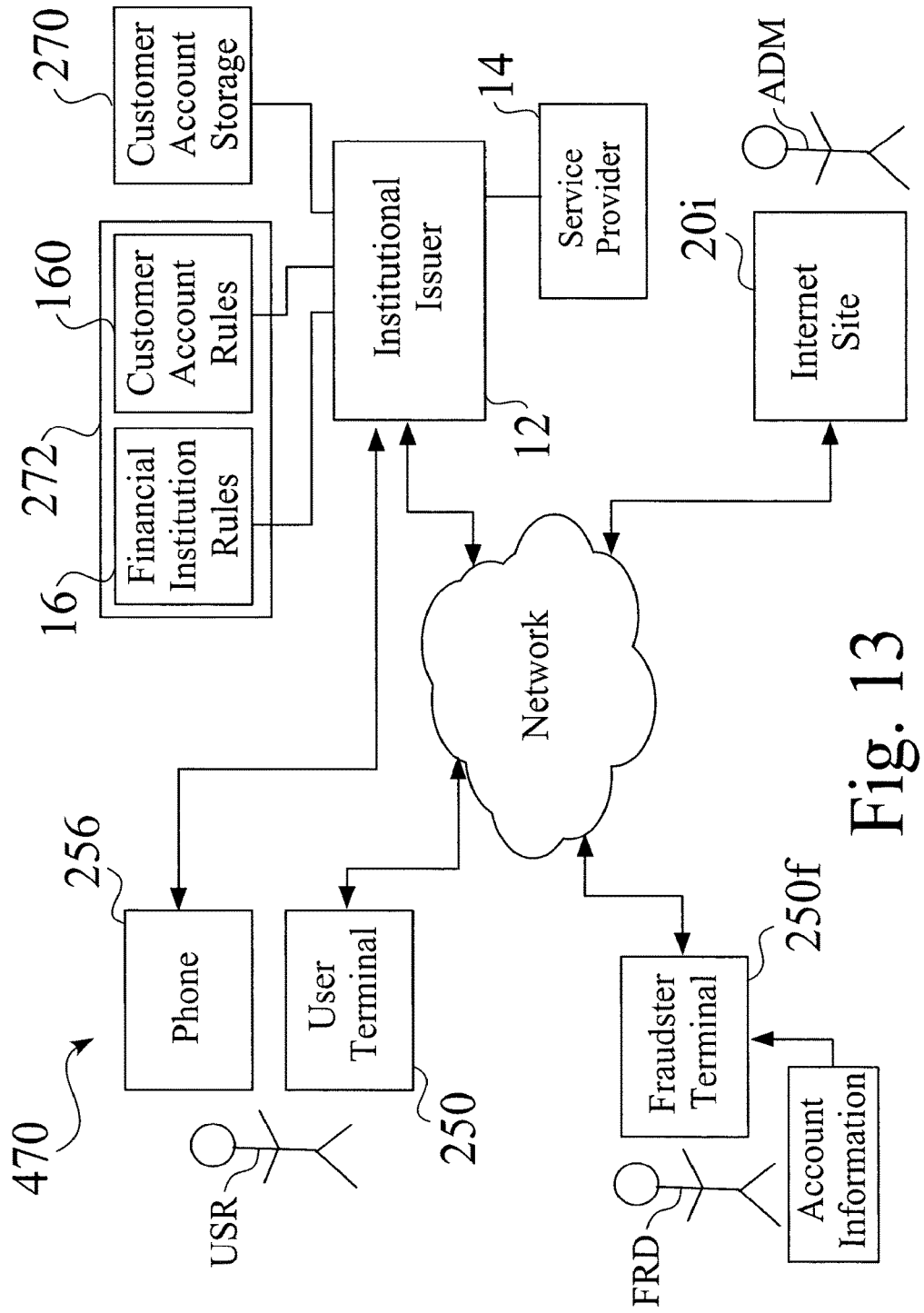
FIG. 13 is a schematic view of an attempted purchase transaction through an Internet site, a request for authorization for an exemplary customer controlled account by an unknown user, e.g. a fraudster, of an access device associated with the customer-controlled account, and optional system communication with the customer in response to non-adherence to one or more customer-controlled rules.

FIG. 12 is a schematic view 450 of an attempted purchase transaction through an internet site 20i, and a request for authorization for an exemplary customer controlled account 182 by an authorized customer user USR of an access device 15 associated with the customer controlled account 182. FIG. 13 is a schematic view 470 of an attempted purchase transaction through an internet site 20i, and a request for authorization for an exemplary customer controlled account 182 by an unknown user, e.g. a suspected fraudster FRD, of an access device 15 or related information associated with the customer controlled account 182.

As seen in FIG. 12, a user USR typically provides information associated with the access device 15 through a user terminal 250, such as within a secure session established with the Internet site 20i. The user may also enter other related information, such as a personal identification (PIN) number through the user terminal 250.

As noted above, the authorization request 52 is then sent for processing, e.g. 300, such as to the institutional issuer computer 12 or to a service provider computer 14 associated with the institutional issuer 12. If the request meets both the centralized, i.e. financial issuer rules 16 as well as the customer-controlled rules 160, the transaction is typically authorized. If the transaction request 52 is denied due to non-adherence to one or more customer-controlled rules 160, the internet site 20i or a site administrator ADM may prompt the customer user USR to communicate with the institutional issuer 12 or service provider 14, e.g. using the phone 256, such as to confirm user identity and to update the customer-controlled rules 160 to allow the transaction.

As seen in FIG. 13, an unknown user FRD may also try to attempt a transaction for products, services, and/or funds 70 through a an Internet site 20i, such as within a secure session established with the Internet site 20i. The unknown user FRD may also enter other related account information, such as a personal identification (PIN) number through the user terminal 250f.

However, if the transaction request 52 is denied due to non-adherence to one or more customer-controlled rules 160, the internet site 20i or an associated administrator ADM may prompt the unknown user FRD to communicate with the institutional issuer 12 or service provider 14, such as to confirm user identity, which may not be possible for the unknown user USR. In such a situation, the institutional issuer 12 or service provider 14 may controllably attempt to contact or notify the customer user USR, such as by telephone 256, by an approved email account listed for the user USR, or directly though a user terminal 250 associated with the proper user USR, through a secure connection. If the proper user USR is contacted, and it is determined that the unknown user FRD is indeed a suspected fraudster FRD, the institutional issuer 12 or service provider 14 can then take appropriate actions to at least deny 392 (FIG. 9) the transaction and notify 394 (FIG. 9) the network merchant 20i, and may close the account 396, attempt to identify 398 the fraudster FRD, notify 400 one or more authorities, and/or further investigate the matter 402.

The customer-controlled rules 160, associated system 100, and method 300 inherently reduce incidents where fraudulent access to consumer and business financial access devices 15, such as credit and check cards, are either approved in instances where fraud is taking place, or where the use is not approved but could have been.

As well, the customer-controlled rules 160, associated system 100, and method 300 allow the system 100 to identify fraudulent attempts timely to use the access device 15 more accurately and more timely, so that the remedial action can be taken.

Furthermore, the customer-controlled rules 160, associated system 100, and method 300 enlist users USR of access devices 15 more actively in efforts to more effectively counter the activities of fraudsters FRD.

In addition, the customer-controlled rules 160, associated system 100, and method 300 create competitive advantages for an institutional issuer 12, by providing enhanced account security for customer users USR, such as to position the institutional issuer 12 as a trusted financial provider and industry leader.

In the customer-controlled rules 160, associated system 100, and method 300, access devices 15 are therefore typically issued with enhanced security features and processes that allow customers USR greater control of the circumstances under which their account can be accessed, thereby ensuring that if a fraudster FRD tries to access the account without knowledge the consumer set controls 160, the system 100 can quickly take remedial action, with reduced instances of false positives.

The customer-controlled rules 160, associated system 100, and method 300 draw the customer USR into the process of controlling access to the user account 182, by allowing the customer to participate in both circumstances under which the access device 15 may be accessed, and in verifying use of the access device 15 at times when the access device 15 and/or associated account 182 is accessed.

The customer controlled account system 100 therefore provides distributed account security that includes input, e.g. rules 160, from the account holder, i.e. customer user USR of an account, as well as real-time management of account transaction approval, such as comprising customer authorization of transactions. The customer controlled account system 100 gives the customer user USR a wide variety of expanded control options, 160,282, which are difficult for fraudsters FRD to circumvent.

As well, in the customer-controlled rules 160, associated system 100, and method 300, an account holder, and/or other appropriate parties within the network who have a need to know, may be notified if and when there is an attempt to access the account holder's credit card and/or debit card account in a manner that is counter to parameters for account access that have been set by the account holder. This allows the account holders and/or other appropriate parties to take preemptive action to thwart the intentions of fraudsters FRD, not only for the account holder USR, in which fraudulent access has been attempted, but potentially for others, based upon information gained as a result of implementation and use of the customer-controlled rules 160, associated system 100, and method 300.

The customer-controlled rules 160, associated system 100, and method 300 may provide significant value for a variety of different transaction scenarios. For example, in one exemplary scenario, a customer user USR may be declined for one or more valid institutional rules 16, such as for an over-limit (OVL) condition or a delinquent account. In such a scenario, a transaction request 52 may also fail a customer-controlled rule 160 or parameter, such as for a transaction that occurs in a foreign country, wherein the customer USR has prohibited out of country transactions. Although the institutional rules 16 clearly determine a decline, the customer settings 160 may preferably be communicated to any or all interested parties, e.g. the customer USR and the issuer 12, and/or the merchant 20, to the hypothesis that fraud might be taking place, whereby one or more actions may be taken, other than simply to decline a transaction. In contrast, a conventional transaction system, e.g. that only uses central rules to "decline" or "approve" a transaction, may overlook such a transaction.

In another exemplary scenario, a customer user USR may be declined for one or more valid institutional rules 16, such as for an institutional issuer 12 that decides to decline all transactions from a designated region or country, e.g. Tahiti. In such a scenario, the customer-controlled system 100, and method 300 may allow the customer to indicate that they are traveling to the designated region or country, e.g. Tahiti, via the system 100. The institutional issuer may preferably approve such a transaction, based on the customer input, or may call or otherwise contact the customer USR to confirm that the transaction is acceptable to approve.

In an alternate exemplary scenario, a customer user USR may be declined for one or more valid institutional rules 16, but may meet 314 the customer settings 160,282. As seen in FIG. 7 and FIG. 8, the institutional issuer 12 or other provider 14 may contact the customer USR via the system 100, such as to contact the customer USR and see if there are extenuating circumstances which may warrant a central override 319.

Although the customer controlled account system and its methods of use are described herein in connection with credit card and/or check card devices operating across a network, the structure and techniques can be implemented for a wide variety of transactional devices, such as but not limited to credit cards, debit cards, gift cards certificates and/or coupons associated with a central institutional issuer or bank, gift cards certificates and/or coupons associated with a specific store or chain of stores, or any combination thereof, as desired.

As well, although the customer controlled account system and its methods of use are described herein in connection with client terminals operating across a network, such as computers, ATMs, Point-of-Sale terminals, servers, wireless devices, personal computers and other microprocessor-based devices, such as wireless appliances, the structure and techniques can be implemented for a wide variety of electronic devices and systems, or any combination thereof, as desired.

Furthermore, while the customer controlled account system and its methods of use are described herein in connection with computing devices and intranets or LAN's, the apparatus and techniques can be implemented for a wide variety of electronic devices and networks or any combination thereof, as desired.

In addition, while the customer controlled account system and its methods of use are described herein in connection with financial transaction systems implemented across a network, the techniques can be implemented for a wide variety of user accounts, such as but not limited to security systems, media or content storage and/or access, and/or information storage and/or retrieval systems.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A process implemented across a network, comprising:
   establishing, by a banking computer system of a financial entity providing a financial account, a first set of rules associated with the financial account and related to a first set of parameters, the first set of rules established and controlled by the banking computer system, wherein the banking computer system is configured to determine results for financial transactions between a customer associated with the financial account and merchants;
   establishing, based on inputs received from a customer computer system, a second set of rules associated with the financial account, the second set of rules customizable by the customer, the customer comprising at least one of an account holder and a user associated with the financial account;
   receiving, by the banking computer system, a request for a transaction associated with the financial account, the request containing identification associated with the financial account; and
   responding, by the banking computer system, to the requested transaction based at least in part on the first set of rules and the second set of rules, including:
   sending, to a mobile device of the customer, a notification when the requested transaction would be declined based on at least one of the second set of rules;
   receiving, from the mobile device of the customer, a response to the notification; and
   allowing the customer to override the at least one of the second set of rules to permit the transaction that would be declined, based on the response received from the mobile device of the customer, wherein allowing the customer to override the at least one of the second set of rules changes the second set of rules only temporarily within dates of travel to foreign destination specified by the customer.

2. The process of claim 1, wherein the response to the transaction request comprises any of
   an authorization of the requested transaction if the transaction complies with both the first set of rules and the second set of rules, and
   a decline of the requested transaction based upon both the first set of rules and the second set of rules.

3. The process of claim 1, wherein responding to the requested transaction comprises a decline of the requested transaction based upon both the first set of rules and the second set of rules, and a notification of the decline to any of the customer and another entity.

4. The process of claim 3, wherein the banking computer system is configured to
   accept customer input which changes at least one rule of the second set of rules; and
   authorize the requested transaction in response to the customer input if the requested transaction complies with both the first set of rules and the second set of rules after the change.

5. The process of claim 1, wherein responding to the requested transaction comprises any of an approval of the requested transaction and an initiation of any of a notification and a communication with the customer, if the requested transaction complies with each of the second set of rules and does not comply with at least one of the first set of rules.

6. The process of claim 1, wherein responding to the requested transaction comprises an approval that is conditionally based upon customer input.

7. The process of claim 1, wherein the second set of rules that are controllable by an account holder are accessed by the account holder through any of a user terminal, a phone connection, a terminal associated with the issuer, and personnel associated with the issuer.

8. The process of claim 1, further comprising:
   declining the requested transaction if the transaction request fails to comply with at least one of the second set of rules.

9. The process of claim 1, further comprising:
   notifying the customer if the transaction request fails to comply with at least one of any of the first set of rules and the second set of rules.

10. The process of claim 1, wherein the selected account is identified by any of an access device and information associated with the account,
    wherein the access device comprises any of a credit card, a debit card, a gift card, a gift certificate, and a coupon, and
    wherein the associated information comprises any of an account number, a user name, a CVC value, an expiration date, information associated with the account holder, and other information that verifies the account.

11. The process of claim 1, wherein at least one of the second set of rules is preset by any of the account issuer and the service provider associated with the account issuer at the time the selected account is established.

12. The process of claim 1, wherein the customer comprises any person that is deemed to be accountable or liable for the actions of the account holder or other account users that are authorized by the account holder to access the account.

13. The process of claim 1, wherein the first set of rules are controllable by the customer by receiving from the customer a first input specifying a selection of at least one parameter associated with the first and second set of rules;
   storing the at least one parameter in a database to define a first configuration of the first set of rules;
   modifying from the first set of rule to the second set of rules based on receiving from the customer, a second input specifying a selection of at least one parameter associated with the first and second set of rules;
   storing the at least one parameter in the database to define the second set of rules; and
   responding to the request for a transaction wherein the response is based at least in part on the first and second set of rules.

14. The process of claim 1, wherein the transaction associated with the respective account is one of the financial transactions between the customer and the merchants.

15. The process of claim 1, wherein
   each of the first set of parameters corresponds to a rule of the first set of rules,
   each of a second set of parameters corresponds to a rule of the second set of rules, and
   at least one of the first set of parameters is different than at least one of the second parameters.

16. The process of claim 1, wherein one rule of the second set of rules states that a maximum amount of funds from the respective financial account used to purchase a class of goods or services is limited.

17. The process of claim 1, wherein one rule of the second set of rules states that funds from the respective financial account used to purchase a class of goods or services exceed a threshold amount.

18. The process of claim 1, wherein allowing the customer to override the at least one of the second set of rules modifies the second set of rules.

19. The process of claim 1, wherein at least one of the second set of rules is related to a parameter that is both not included within the first set of parameters and unrelated to the amount of the transaction.

* * * * *